(12) United States Patent
Miller et al.

(10) Patent No.: US 11,366,630 B2
(45) Date of Patent: Jun. 21, 2022

(54) MULTI-USER MEDIA PRESENTATION SYSTEM

(71) Applicant: Meta Platforms, Inc., Menlo Park, CA (US)

(72) Inventors: Joshua Alexander Miller, London (GB); Leo Litterello Mancini, Middle Village, NY (US); Michael Slater, Nottingham (GB)

(73) Assignee: Meta Platforms, Inc., Menlo Park, CA (US)

( * ) Notice: Subject to any disclaimer, the term of this patent is extended or adjusted under 35 U.S.C. 154(b) by 150 days.

(21) Appl. No.: 16/883,819

(22) Filed: May 26, 2020

(65) Prior Publication Data

US 2020/0341716 A1    Oct. 29, 2020

Related U.S. Application Data

(63) Continuation of application No. 16/436,641, filed on Jun. 10, 2019, now Pat. No. 10,664,222, which is a
(Continued)

(51) Int. Cl.
*G06F 3/14* (2006.01)
*H04L 65/60* (2022.01)
(Continued)

(52) U.S. Cl.
CPC ............ *G06F 3/1454* (2013.01); *H04L 51/32* (2013.01); *H04L 63/08* (2013.01); *H04L 63/10* (2013.01); *H04L 65/4069* (2013.01); *H04L 65/60* (2013.01); *H04L 65/605* (2013.01); *H04L 67/06* (2013.01); *H04L 67/18* (2013.01);
(Continued)

(58) Field of Classification Search
CPC ....... G06F 3/1454; H04L 51/32; H04L 63/08; H04L 63/10; H04L 65/4069; H04L 65/60; H04L 65/605; H04L 67/06; H04L 67/18; H04L 67/306; H04L 51/10; H04N 21/43072; H04N 21/4788; H04N 21/4825;
(Continued)

(56) References Cited

U.S. PATENT DOCUMENTS 4,893,256 A * 1/1990 Rutherfoord ........... G06F 16/40
700/15
6,230,162 B1 * 5/2001 Kumar ............... H04N 7/17318
348/E7.071
(Continued)

OTHER PUBLICATIONS

U.S. Appl. No. 14/675,401, dated Aug. 12, 2016, Office Action.
(Continued)

*Primary Examiner* — J. Brant Murphy
(74) *Attorney, Agent, or Firm* — Keller Preece PLLC

(57) ABSTRACT

One or more embodiments of the disclosure provide systems and methods for providing media presentations to users of a media presentation system. A media presentation generally includes a plurality of media segments provided by multiple users of the media presentation system. In one or more embodiments, a user of the media presentation system may share a media presentation with a co-user. The media presentation system can enable the co-user, if authorized by the user, to contribute (e.g., add a media segment) to a media presentation shared with the co-user.

20 Claims, 13 Drawing Sheets

Related U.S. Application Data continuation of application No. 15/937,445, filed on Mar. 27, 2018, now Pat. No. 10,318,231, which is a continuation of application No. 14/755,837, filed on Jun. 30, 2015, now Pat. No. 9,928,023, which is a continuation of application No. 14/675,401, filed on Mar. 31, 2015, now Pat. No. 9,772,813.

(51) Int. Cl.

| | | |
|---|---|---|
| *H04L 65/61* | (2022.01) | |
| *H04L 9/40* | (2022.01) | |
| *H04N 21/4788* | (2011.01) | |
| *H04N 21/482* | (2011.01) | |
| *H04L 67/06* | (2022.01) | |
| *H04L 67/306* | (2022.01) | |
| *H04N 21/43* | (2011.01) | |
| *H04L 51/52* | (2022.01) | |
| *H04L 67/52* | (2022.01) | |
| *H04L 51/10* | (2022.01) | |

(52) U.S. Cl.
CPC ..... *H04L 67/306* (2013.01); *H04N 21/43072* (2020.08); *H04N 21/4788* (2013.01); *H04N 21/4825* (2013.01); *G09G 2370/10* (2013.01); *G09G 2370/16* (2013.01); *H04L 51/10* (2013.01)

(58) Field of Classification Search
CPC ........... H04N 21/4307; G09G 2370/10; G09G 2370/16
See application file for complete search history.

(56) References Cited

U.S. PATENT DOCUMENTS

| | | | | |
|---|---|---|---|---|
| 6,976,028 | B2* | 12/2005 | Fenton | G06F 16/48 |
| | | | | 707/916 |
| 9,032,299 | B2* | 5/2015 | Lyons | H04N 9/8227 |
| | | | | 715/721 |
| 9,112,849 | B1* | 8/2015 | Werkelin Ahlin | |
| | | | | H04N 21/25816 |
| 9,497,180 | B2* | 11/2016 | Oyman | H04L 63/0876 |
| 9,772,813 | B2 | 9/2017 | Miller et al. | |
| 9,928,023 | B2 | 3/2018 | Miller et al. | |
| 10,318,231 | B2 | 6/2019 | Miller et al. | |
| 2002/0194195 | A1* | 12/2002 | Fenton | G06F 16/447 |
| 2007/0003224 | A1* | 1/2007 | Krikorian | H04N 21/440263 |
| | | | | 386/220 |
| 2009/0171995 | A1* | 7/2009 | Silvester | G06F 16/437 |
| | | | | 707/999.102 |
| 2010/0153831 | A1* | 6/2010 | Beaton | G06Q 30/02 |
| | | | | 715/201 |
| 2011/0145868 | A1* | 6/2011 | Hultkrantz | H04L 65/4015 |
| | | | | 725/62 |
| 2011/0246495 | A1* | 10/2011 | Mallinson | G06Q 30/02 |
| | | | | 709/204 |
| 2012/0296972 | A1* | 11/2012 | Backer | H04N 21/242 |
| | | | | 709/204 |
| 2013/0117365 | A1* | 5/2013 | Padmanabhan | H04L 51/32 |
| | | | | 709/204 |
| 2013/0117692 | A1* | 5/2013 | Padmanabhan | H04L 65/403 |
| | | | | 715/753 |
| 2014/0067998 | A1* | 3/2014 | Garcia | G06Q 30/0277 |
| | | | | 709/217 |
| 2014/0143440 | A1* | 5/2014 | Ramamurthy | H04N 21/2393 |
| | | | | 709/231 |
| 2014/0188997 | A1* | 7/2014 | Schneiderman | H04L 51/32 |
| | | | | 709/204 |
| 2014/0201334 | A1* | 7/2014 | Wang | H04N 21/44209 |
| | | | | 709/219 |
| 2014/0281010 | A1* | 9/2014 | Panje | H04L 65/60 |
| | | | | 709/231 |
| 2014/0317306 | A1* | 10/2014 | Giladi | H04L 65/80 |
| | | | | 709/231 |
| 2015/0046812 | A1* | 2/2015 | Darby | H04L 65/60 |
| | | | | 715/716 |
| 2015/0088890 | A1* | 3/2015 | Hoffert | G06F 16/41 |
| | | | | 707/737 |
| 2015/0172353 | A1* | 6/2015 | Hannuksela | H04L 65/608 |
| | | | | 709/219 |
| 2015/0256600 | A1* | 9/2015 | Dakhane | H04L 65/601 |
| | | | | 709/203 |
| 2015/0278232 | A1* | 10/2015 | Shahraray | G06F 16/9562 |
| | | | | 707/756 |
| 2015/0293681 | A1* | 10/2015 | Wheeler | G06F 3/04883 |
| | | | | 715/716 |
| 2015/0294634 | A1* | 10/2015 | Jung | H04L 51/32 |
| | | | | 345/212 |
| 2016/0050172 | A1* | 2/2016 | Weil | G06F 3/048 |
| | | | | 709/206 |
| 2016/0191590 | A1* | 6/2016 | Werkelin Ahlin | H04L 63/08 |
| | | | | 726/4 |
| 2016/0198012 | A1* | 7/2016 | Fablet | H04L 65/4084 |
| | | | | 709/231 |
| 2016/0216871 | A1* | 7/2016 | Stamatiou | G06F 3/04845 |
| 2016/0234345 | A1* | 8/2016 | Roberts, Jr | H04L 65/4084 |
| 2016/0291921 | A1 | 10/2016 | Miller et al. | |
| 2016/0294799 | A1 | 10/2016 | Miller et al. | |
| 2017/0013289 | A1* | 1/2017 | Nightingale | H04N 21/4334 |
| 2017/0104824 | A1* | 4/2017 | Bajwa | H04L 65/40 |

OTHER PUBLICATIONS

U.S. Appl. No. 14/675,401, dated May 24, 2017, Notice of Allowance.
U.S. Appl. No. 14/755,837, dated Sep. 13, 2016, Office Action.
U.S. Appl. No. 14/755,837, dated May 18, 2017, Office Action.
U.S. Appl. No. 14/755,837, dated Nov. 8, 2017, Notice of Allowance.
U.S. Appl. No. 15/937,445, dated Sep. 7, 2018, Office Action.
U.S. Appl. No. 15/937,445, dated Jan. 28, 2019, Notice of Allowance.
U.S. Appl. No. 16/436,641, dated Oct. 2, 2019, Office Action.
U.S. Appl. No. 16/436,641, dated Jan. 28, 2020, Notice of Allowance.

* cited by examiner

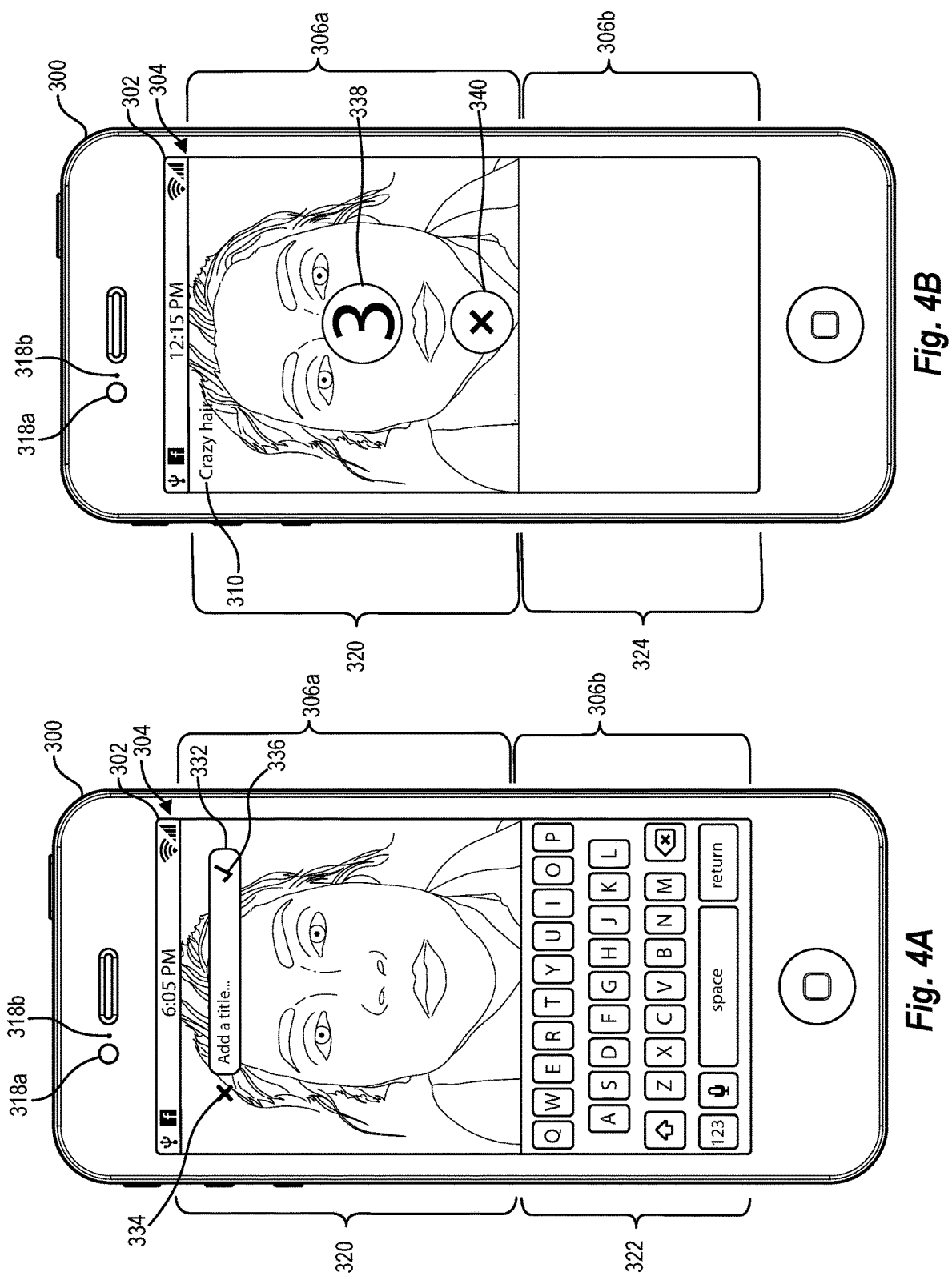

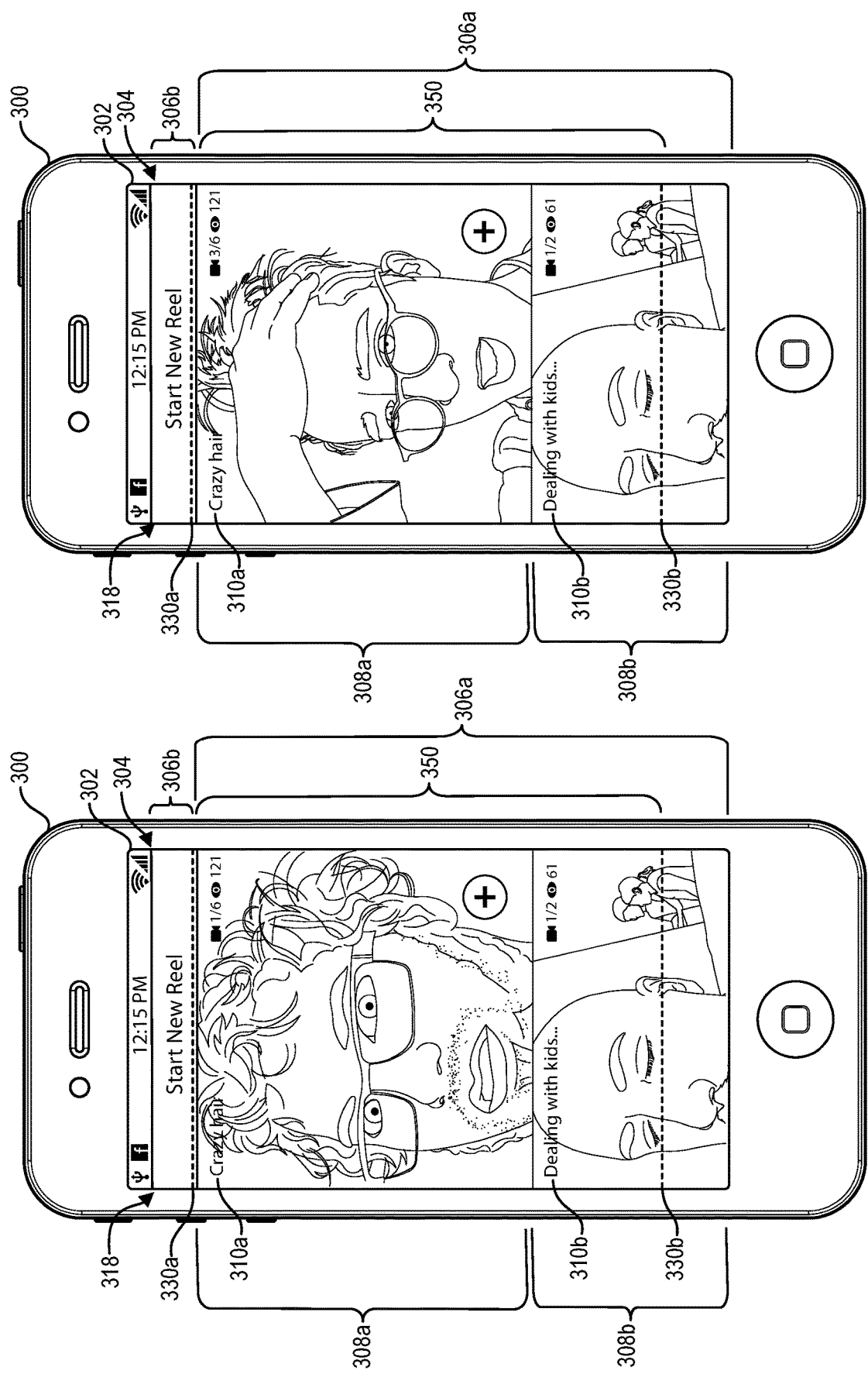

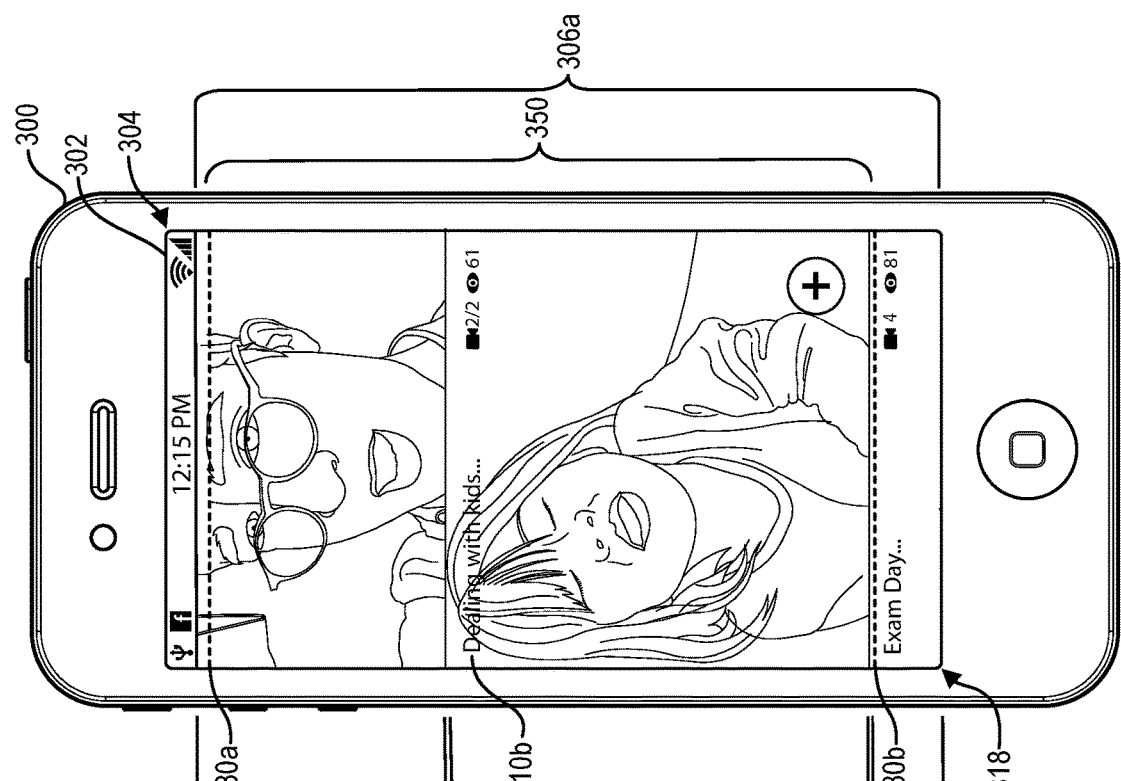
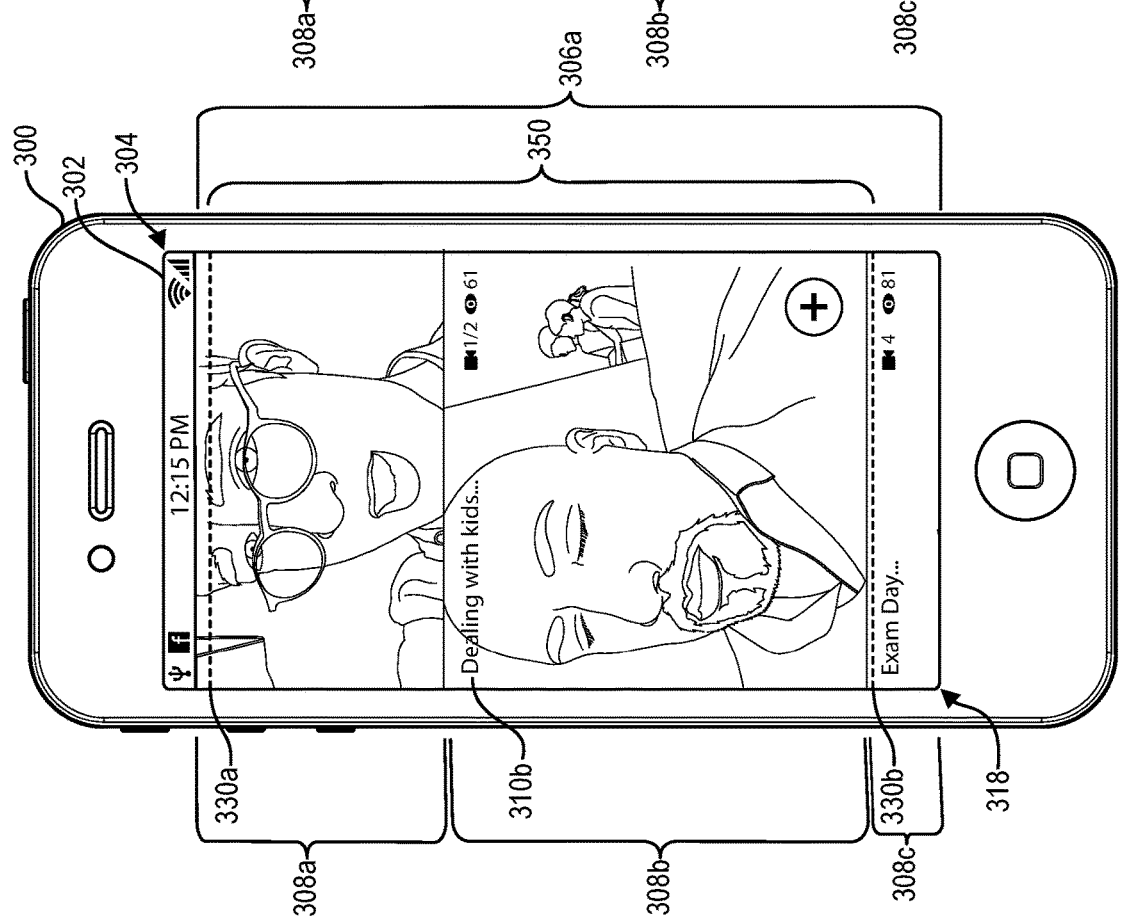
Fig. 5D
Fig. 5C

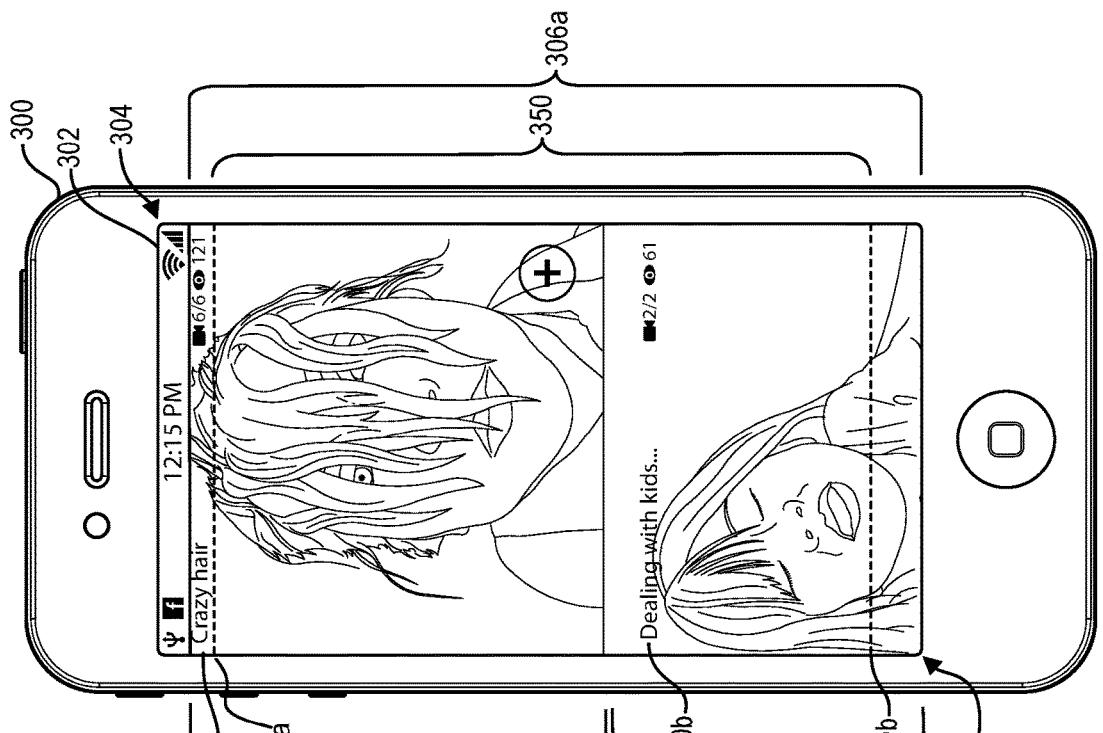
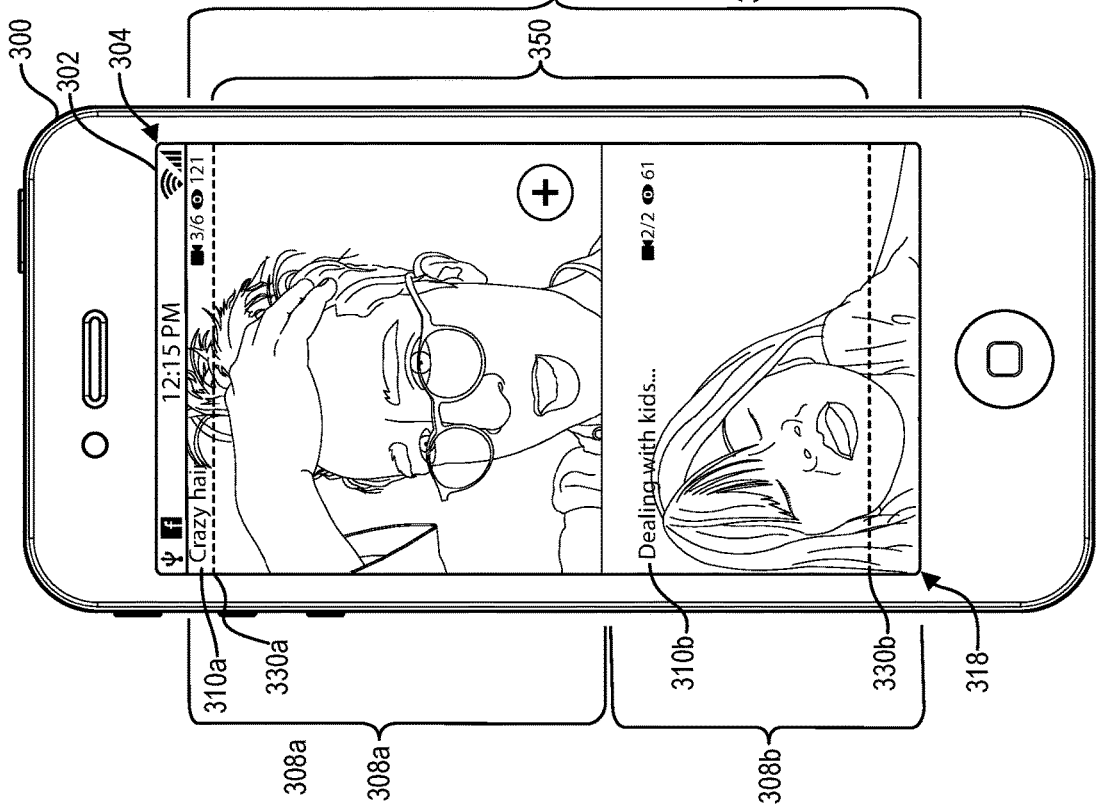
Fig. 5E
Fig. 5F

MULTI-USER MEDIA PRESENTATION SYSTEM

CROSS REFERENCE TO RELATED APPLICATIONS

The present application is a continuation of U.S. application Ser. No. 16/436,641, filed Jun. 10, 2019, which is a continuation of U.S. application Ser. No. 15/937,445, filed Mar. 27, 2018, now issued as U.S. Pat. No. 10,318,231, which is a continuation of U.S. application Ser. No. 14/755,837, filed Jun. 30, 2015, now issued as U.S. Pat. No. 9,928,023, which is a continuation of U.S. application Ser. No. 14/675,401, filed Mar. 31, 2015, now issued as U.S. Pat. No. 9,772,813. The aforementioned applications are hereby incorporated by reference in their entirety.

BACKGROUND

1. Technical Field

One or more embodiments relate to systems and methods for providing media content to multiple users. More specifically, one or more embodiments of the present invention relate to systems and methods for distributing media content among multiple users.

2. Background and Relevant Art

Through advancements in computing devices and computing technology, users can often share user-generated media with other users. As such, users are increasingly capturing and sharing experiences using various computing devices. For example, modern mobile devices enable users to capture and share pictures, videos, and text with co-users (e.g., family members, co-workers, friends, or with the public at large). For instance, a user can share user-generated content with a group of friends via a variety of communication systems (e.g., IM, text, or social networks).

Despite advances in technology, a number of drawbacks remain for a user wanting to share user-generated media with other users. For example, conventional communication systems that allow users to share user-generated media often provide a cluttered and confusing presentation of the shared content. To illustrate, a user can create a new media post upon sharing a picture or video with a group of co-users. One or more co-users in the group may respond to the post by sharing another picture or video with the group. Accordingly, the user, the co-user, and other co-users in the group can continue to share pictures and/or videos under the original post. As the number of shared pictures and shared videos increase, conventional systems typically create a list of response posts, and thus the list of responses can become long, cluttered, and difficult to navigate.

Another disadvantage of conventional systems is that many conventional systems are directed toward media posts that are individualistic in nature. In other words, a thread of posts between multiple users focuses on interactions between the individual user that created the post and the other co-users interacting with the user, rather than a group of users interacting with each other as a group. Thus, many conventional systems do not provide an environment where a group of users can co-create and share group-created media with each other.

Some conventional systems that allow users to share user-generated media with other users attempt to reduce interface clutter by removing, deleting, or denying additional access to shared media once a co-user accesses the shared media. Specifically, in these conventional systems, a co-user's access to the shared media ends after the co-user accesses the shared media (e.g., views a shared photo or video). Although these conventional systems provide an effort to reduce clutter, these conventional systems do so at the expense of further increasing the isolation of each post between users. In other words, because users view each media post in isolation, and because each media post is removed automatically after a user accesses the media, participating in a media conversation using these conventional systems is difficult. This is especially the case with a group media conversation involving multiple users.

Accordingly, there are a number of considerations to be made in improving a user experience in relation to creating and participating in multimedia conversations with a group of users.

SUMMARY

One or more embodiments described herein provide benefits and/or solve one or more of the foregoing or other problems in the art with systems and methods of creating and sharing collaborative media content between co-users. For example, principles described herein provide systems and methods that allow a user to view, contribute to, and create media presentations that include media segments generated and provided by the user and/or multiple co-users. In particular, one or more embodiments described herein include systems and methods for generating and distributing a collaborative media presentation that includes media segments contributed by multiple users. In addition, the principles described herein provide systems and methods for providing a user interface for providing numerous media presentations to a user in an efficient and intuitive manner.

In particular, the systems and methods disclosed herein allow multiple co-users to create collaborative media presentations to share with each other and other co-users. For example, the methods and systems enable a user to easily append media to a media presentation shared from a co-user. To illustrate, a user can receive a shared video presentation that originates from a co-user. The systems and methods described herein provide the user the ability to easily capture and append a new video to the shared video presentation. Specifically, after the user appends the new video to the shared video presentation, the shared video presentation includes two video segments (e.g., the original shared video, and the new video). The systems and methods described herein can then facilitate the sharing of the video presentation with the appended new video with other co-users, for example, a group of co-users.

In some embodiments, the systems and methods disclosed herein can determine if a user is authorized to add media to a media presentation shared with the user. For example, in some example embodiments, the systems and methods may determine a user that created a media presentation has authorized a co-user to view the media presentation, but the co-user is not authorized to add or append media to the collaborative media presentation. Furthermore, in one or more embodiments, a user that creates a media presentation may place additional restrictions or limitations on the number, length, and type of media that other co-users can add to the media presentation.

In addition, the systems and methods disclosed herein provide a user with a media presentation feed that organizes media presentations for presentation to the user. For example, the systems and methods disclosed herein provide a graphical user interface that enables efficient navigation between media presentations within a feed of media presentations. Moreover, the systems and methods disclosed herein provide efficient and intuitive navigation between various media segments within a media presentation. As a result, a user can quickly navigate and experience the media presentations in a manner that reduces user interface clutter and increases user enjoyment. Similarly, a user can intuitively navigate through media segments within a media presentation to experience a media presentation in an enjoyable manner.

Additional features and advantages will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter.

BRIEF DESCRIPTION OF THE DRAWINGS

In order to describe the manner in which the above recited and other advantages and features of one or more embodiments can be obtained, a more particular description will be rendered by reference to specific embodiments thereof that are illustrated in the accompanying drawings. It should be noted that the figures are not drawn to scale, and that elements of similar structure or function are generally represented by like reference numerals for illustrative purposes throughout the figures. These drawings depict only typical embodiments, and are not therefore considered to be limiting of its scope. Accordingly, various embodiments will be described and explained with additional specificity and detail using the accompanying drawings.

FIGS. 4A-4D illustrate an exemplary graphical user interface showing an example process of capturing a media segment to add to a media presentation in accordance with one or more embodiments;

FIG. 5A-5F illustrate an exemplary graphical user interface of an example process of playing one or more media presentations in accordance with one or more embodiments;

DETAILED DESCRIPTION

Figure 1:
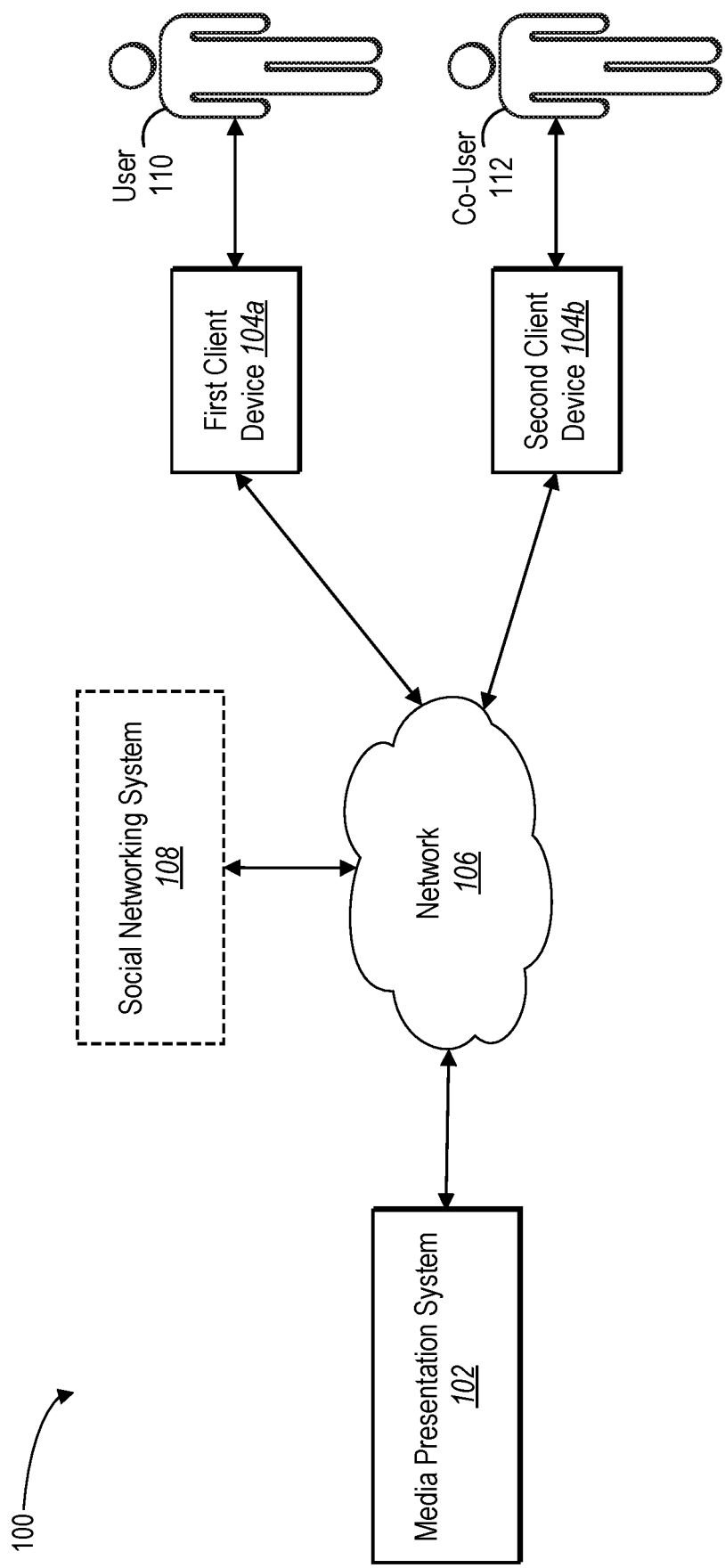
FIG. 1 illustrates a schematic diagram of a communication system in accordance with one or more embodiments described herein.

Embodiments disclosed herein provide benefits and/or solve one or more of the abovementioned or other problems in the art with a media presentation system that improves a user's experience for creating and participating in collaborative multimedia conversations with other users. In particular, the media presentation system easily allows a user to receive, view, contribute to, and create media presentations that include media segments contributed by multiple users. Additionally, in one or more embodiments, the media presentation system provides an intuitive graphical user interface that allows a user to efficiently navigate, view, create, contribute to, and otherwise experience media presentations within a media presentation feed.

In particular, one or more embodiments of the media presentation system allow a user to view media presentations created by one or more co-users of the media presentation system. For example, the co-user may capture a media segment with a client device. Using the captured media segment, the media presentation system may generate a media presentation and share the media presentation with the user and other co-users (e.g., send the media presentation to computing devices associated with the user and other co-users).

In addition, after receiving the media presentation, the user and/or one or more other co-users of the media presentation system may add one or more media segments to the media presentation. The media presentation system can manage the media presentation to provide the one or more added media segments to the user and co-users. For example, the media presentation system can update the media presentation to include the one or more added media segments in the media presentation (e.g., the media presentation system can append the added media segments to the media presentation). As such, the media presentation system can provide an updated media presentation to the user and other co-users that includes the one or more added media segments for the users to view or otherwise experience.

In some example embodiments, for instance, the media presentation system may include a menu option, button, or other selectable graphical element that allows the user to add a media segment to the media presentation. For example, in one or more embodiments the media presentation system can graphically overlay a selectable graphical element over the presentation of a media presentation. Upon the user interacting with the selectable graphical element, the media presentation system can allow the user to add a media segment to the media presentation.

A user's ability to add a media segment to a media presentation may depend on whether the user is authorized to add a media segment to the media presentation. In one or more embodiments, for example, the media presentation system may allow a user that creates a media presentation to associate permissions or authorizations with the media presentation. For instance, the media presentation system can allow a user to authorize only a select user, or a select group of users, to add a media segment to a media presentation that the user creates. In other embodiments, however, a user can authorize any user to add media segments to a media presentation (e.g., an open public media presentation). Therefore, one or more example media presentation systems allow a user to control which other users of the media presentation system can add a media segment to a media presentation the user creates.

Accordingly, in one or more embodiments, the media presentation system can determine whether a user is authorized to add a media segment to a media presentation. For example, the media presentation system may determine whether a user that created a media presentation authorized the user to add a media segment to the media presentation. In some instances, when the media presentation system determines that the user is not permitted to add a media segment to a media presentation, the media presentation system can permit the user to view the media presentation, but not add a media segment to the media presentation. In one or more embodiments, the media presentation system suppresses the display of a selectable graphical element, which allows the user to add a media segment to the media presentation when the user is not authorized to add a media segment.

As will be further explained below, some example embodiments of the media presentation system provide a graphical user interface that presents a plurality of media presentations to a user. For example, the media presentation system may present a plurality of media presentations to the user in a media presentation feed. As the user navigates through the media presentations in the media presentation feed, the media presentation system may selectively activate (e.g., play) and deactivate (e.g., pause) media presentations based on the location of the media presentations within the media presentation feed with respect to the graphical user interface.

In addition to presenting several media presentations to the user, in some embodiments, the media presentation system can enable the user to start or otherwise create a media presentation. For instance, and as discussed briefly above, the media presentation system can assist the user in selecting which co-users can view the media presentation and/or which co-users can add to the media presentation. Further, the media presentation system may allow the user to approve, edit, or remove media segments added by the user or by other co-users to the media presentation.

Accordingly, one or more embodiments of the media presentation system overcome one or more of the disadvantages of conventional systems by providing systems and methods to allow users to create and share collaborative media presentations. As such, example embodiments of the media presentation system allow users to participate in collaborative media conversations in an intuitive and enjoyable manner. Moreover, one or more embodiments of the media presentation system provide a graphical user interface that eliminates user interface clutter and confusion inherent in conventional systems due to having duplicate copies of media and/or long lists of media, which require the user to spend significant amounts of time to manually experience the shared media content. In addition, and as will be describe in more detail below, example embodiments of a media presentation system can provide continued access to a collaborative media presentation for users to continue to enjoy and share, while at the same time overcoming user interface clutter (e.g., a user's media contribution is not simply erased to reduce clutter as with some conventional systems).

The term "media," as used herein refers to digital data that may be transmitted over a communication network. Examples of media include, but are not limited to, digital photos, digital video files, digital audio files, and/or streaming content. Accordingly, media may refer to images, video, audio, text, documents, animations, or any other audio/visual content that may be transmitted over a communication network. In addition, examples of media can include user-generated media (e.g., content that a user captures using a media capturing feature of a smart phone, such as digital photos or videos) as well as nonuser-generated media (e.g., content generated by a party other than a user, but to which the user has access).

The term "media segment," as used herein refers generally to a discrete portion of media. A media segment may include an image segment, video segment, and/or an audio segment. For example, a media segment may be an image segment that is displayed for a duration of time. As another example, a media segment may include a video clip or an audio clip.

As used herein, the term "media presentation" refers to a defined set of one or more media segments. For example, a media presentation can include a plurality of media segments contributed by one or more users. As such, in one or more embodiments, a media presentation can include a compilation of media segments composed by multiple users. For example, a media presentation may include a thread of related media segments captured by two or more users in a conversation with each other about a particular topic. Additionally, a media presentation can include a single media segment, provided by a user, to which other users can append one or more additional media segments (e.g., the creation of a new media presentation).

As used herein, the terms "interact" or "interacting" refer generally to any type of interface activity between a user and a client device. For example, interacting can include a user viewing, browsing, accessing, and/or otherwise experiencing video content. Moreover, interacting can include selecting elements on a client device, such as selecting menu options or graphical buttons to create a media presentation or add a media segment to an existing media presentation. For instance, a user can interact with a client device to capture a media segment, replay a captured media segment, approve a captured media segment, request a captured media segment be added to a media presentation, or cancel capture of a media segment. In one or more embodiments, a user can interact with a client device using one or more user input devices, such as a touch screen, touchpad, or mouse.

FIG. 1 illustrates an example embodiment of a communication system 100 (or simply, "system 100") in accordance with one or more embodiments described herein. As shown, the system 100 may include a media presentation system 102, a first client device 104a, and a second client device 104b (collectively "client devices 104"), that are communicatively coupled through a network 106. Optionally, the system 100 may include a social networking system 108 connected to the media presentation system 102 and client devices 104 via the network 106. Although FIG. 1 illustrates a particular arrangement of the media presentation system 102, client devices 104, the social networking system 108, and the network 106, various additional arrangements are possible. For example, the client devices 104 may directly communicate with the media presentation system 102, bypassing the network 106.

As mentioned above, the media presentation system 102, the client devices 104, and the social networking system 108 may communicate via the network 106. The network 106 may include one or more networks and may use one or more communications platforms or technologies suitable for transmitting data and/or communication signals. Additional details relating to the network 106 are explained below with reference to FIG. 8.

As further illustrated in FIG. 1, a user 110 may interact with the first client device 104a and a co-user 112 may interact with the second client device 104b. The user 110 and/or the co-user 112 may be an individual (i.e., human user), a business, a group, or other entity. For sake of explanation, FIG. 1 illustrates only one user 110 and one co-user 112, however, it should be understood that system 100 may include any number of users, with each of the users interacting with the system 100 with one or more client devices. Likewise, it should be understood that the terms "user" and "co-user" are generally used for purposes of explanation, and that the user 110 and the co-user 112 are both simply users of the media presentation system 102.

As mentioned above, the user 110 and the co-user 112 may interact with client devices 104a and 104b, respectively, to communicate with the media presentation system 102 and/or social networking system 108. The client devices 104 may represent various types of client devices. For example, the client devices 104 can include: a mobile device such as a mobile telephone, a smartphone, a PDA, a tablet, a laptop; a non-mobile device such as a desktop or server; or any other type of computing device. Additional details and examples with respect to the client devices 104 are discussed below with respect to FIG. 8.

As shown in FIG. 1 and as mentioned above, the system 100 can include the social networking system 108. In some embodiments, however, the system 100 does not include a social networking system 108. Nevertheless, the media presentation system 102, the user 110, and/or the co-user 112 may be associated with the social networking system 108. For example, the user 110 may authorize the media presentation system 102 to access the social networking system 108 to obtain information about the user 110, such as the user's social networking contacts and affinity to each social networking contact. The media presentation system 102 may also use the social networking system 108 to share media presentations among users of the media presentation system 102 who are also users of the social networking system 108. For instance, the media presentation system 102 may post, on behalf of the user 110, a media presentation to which the user contributes, on newsfeeds of social networking users who are connected to the user 110.

As briefly discussed above, the system 100 includes the media presentation system 102. In general, the media presentation system 102 facilitates the generation and distribution of media presentations. The media presentation system 102 further enables the user 110 to share media presentations with the co-user 112, as well as receive shared media presentations from the co-user 112.

Regardless of the particular components or arrangement of components of the system 100, the system 100 generally allows users of the system to create and share media presentations that include media segments contributed from multiple users. As a non-limiting overview example, the co-user 112 may capture media on the second client device 104b (e.g., a digital video) and create a media presentation that includes the captured media as a media segment. The co-user 112 can then share the media presentation with the user 110 via the media presentation system 102. For example, the media presentation system 102 can provide the media presentation to the first client device 104a to present the media presentation to the user 110.

In addition, the media presentation system 102 can facilitate a process to allow the user 110 to add a media segment to the media presentation. For example, the user 110 can use the first client device 104a to capture a media segment that the media presentation system 102 can append to the media presentation. The media presentation system 102 may then provide the appended media presentation to the second client device 104b for presentation to co-user 112. The media presentation system 102 may also provide additional media presentations to the user 110 and the co-user 112 from other co-users of the media presentation system 102. Additional details of the media presentation system 102 will be described in additional detail with respect to FIG. 2.

Figure 2:
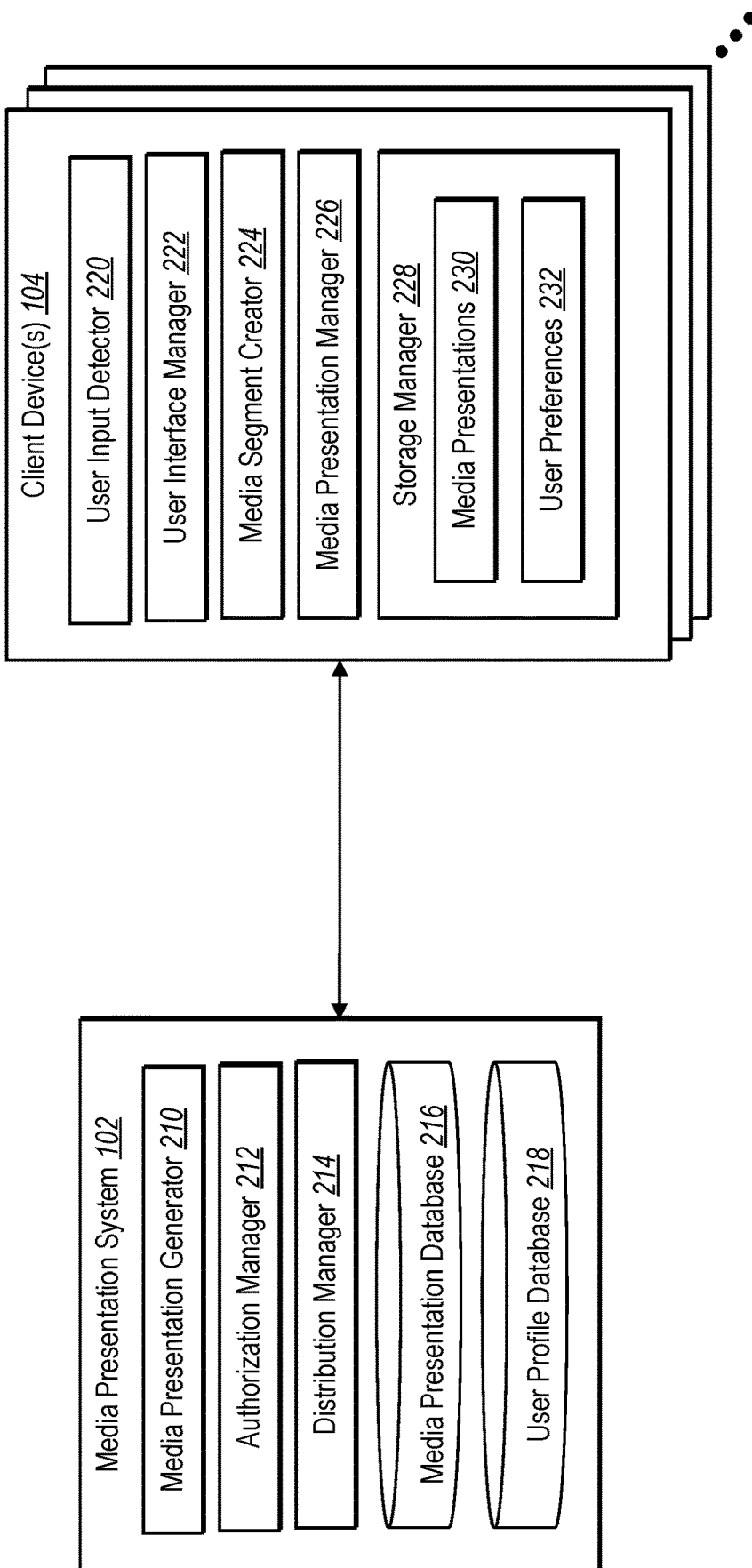
FIG. 2 illustrates a schematic diagram of a media presentation system in communication with one or more client devices in accordance with one or more embodiments described herein.

FIG. 2 illustrates a schematic diagram of a media presentation system 102 in communication with one or more client devices 104. The media presentation system 102 in FIG. 2 can represent one or more embodiments of the media presentation system 102 discussed above with reference to FIG. 1. Similarly, the client device 104 shown in FIG. 2 may represent one or more embodiments of the first client device 104a and/or the second client device 104b discussed above with reference to FIG. 1. For example, the media presentation system 102 and the client device 104 in FIG. 2 can be part of the communication system 100 illustrated in FIG. 1.

As illustrated in FIG. 2, the media presentation system 102 can include, but is not limited to, a media presentation generator 210, an authorization manager 212, a distribution manager 214, a media presentation database 216, and a user profile database 218. In general, the media presentation generator 210 can receive media segments from the client device(s) 104 and use the media segments to generate new or updated media presentations. The authorization manager 212 can manage permissions associated with media presentations, for example, whether or not a particular user is authorized to add media segments to a particular media presentation. The distribution manager 214 can provide media presentations to one or more users of the media presentation system 102 via the client device(s) 104. The media presentation database 216 can maintain a plurality of media presentations and/or media segments, and the user profile database 218 can maintain user information for users of the media presentation system 102.

Each component of the media presentation system 102 may be implemented using a computing device including at least one processor executing instructions that cause the media presentation system 102 to perform the processes described herein. In some embodiments, the components of the media presentation system 102 can be implemented by a single server device, or across multiple server devices. Although a particular number of components are shown in FIG. 2, the media presentation system 102 can include more components or can combine the components into fewer components (such as a single component), as may be desirable for a particular embodiment.

As briefly mentioned above, and as illustrated in FIG. 2, the media presentation system 102 may include a media presentation generator 210. The media presentation generator 210 may create a new media presentation or generate an updated media presentation, as described below. The media presentation generator 210 may also communicate with the media presentation database 216, which may store media presentations and/or media segments.

In one or more embodiments, for example, the media presentation generator 210 may generate a media presentation when the media presentation system 102 receives one or more media segments from the client device 104. For example, a user may request, on the client device 104, to create a new media presentation or add a media segment to an existing media presentation. In response, the client device 104 may capture a media segment, and then send the media segment to the media presentation system 102 to create a new media presentation or to add to an existing media presentation.

To illustrate, the media presentation system 102 may receive a media segment from the first client device 104a. The media segment may include an indication that identifies the media segment as a new media presentation or identifies the media segment as corresponding to an existing media presentation. For example, a media segment may include metadata that identifies the media segment as part of a new media presentation or as part of an existing media presentation. For instance, in the event a user, via the first client device 104a, submits a media segment intended to be the first media segment of a new media presentation, the metadata can include identification data that is null or identification data that otherwise indicates the media segment is not associated with any existing media presentation. On the other hand, when a user submits a media segment that is intended to be associated with an existing media presentation, the metadata can include identification data that uniquely references the existing media presentation.

Accordingly, after the media presentation system 102 receives a media segment, the media presentation generator 210 may determine that the media segment is not associated with an existing media presentation, and in response, the media presentation generator 210 may generate a new media presentation that includes the received media segment. As part of creating a new media presentation, for example, the media presentation generator 210 can associate identification data with the media presentation that the media presentation system 102 can use to identify the media presentation, as well as associate other properties or settings with the media presentation, as will be further described below.

In some embodiments, upon creating a media presentation, the media presentation generator 210 can create a media presentation file to store information and metadata for the media presentation. The file may include data structures such as one or more tables, arrays, databases, etc. Further, the media presentation generator 210 may store the media presentation file in the media presentation database 216 in connection with the media presentation.

The media presentation file can include information, such as a user ID corresponding to the user that created the file. In addition, the media presentation file can include links or pointers to media segments included in the media presentation (e.g., the location of a media segment stored within the media presentation database 216). Further, the media presentation file can include information about each media segment, such as which users contributed each media segment, which users are associated with each media segment (e.g., tagged, identified in, etc.), the order each media segment should be presented on the client device 104 (e.g., play list order), a image that represent each file (e.g., a frame from the media segment, a user selected image, a default image, etc.), and/or information about each media segment (e.g., likes, shares, views, etc.). In this manner, the media presentation generator 210 may create a media presentation by associating and/or threading a number of media segments together.

Further, the media presentation file can include permission and authorization information. For example, the media presentation file may indicate which users are authorized to view and which users are permitted to contribute to the media presentation. As another example, the media presentation file can indicate which users can modify media segments within the media presentation and/or remove the media presentation from the media presentation system 102.

In addition to determining a media segment is not associated with an existing media presentation, the media presentation generator 210 can determine that a received media segment is associated with an existing media presentation. Based on determining that a media segment is associated with an existing media presentation, the media presentation generator 210 may update the existing media presentation to include the received media segment.

In one or more embodiments, the media presentation generator 210 may append the received media segment to one or more media segments corresponding to a media presentation. Specifically, the media presentation system 102 may receive a media segment from a client device 104. Further, the media presentation system 102 may identify the received media segment as belonging to an existing media presentation. Next, the media presentation generator 210 may append the received media file to the identified media presentation.

In some example embodiments, the media presentation generator 210 may append a media segment to a media presentation by updating the media presentation file associated with the media presentation. For example, upon the media presentation system 102 receiving a media segment that is to be appended or added to an existing media presentation, the media presentation generator 210 may update the media presentation file to point to the received media segment. For instance, the media presentation generator 210 may add a link or pointer to the location the received media segment is stored in the media presentation database 216 and/or by a third-party (e.g., linked to or embedded on a third-party site).

The media presentation generator 210 may also update the media presentation file associated with the media presentation to indicate the position or order of the received media segment in relation to the other media segments in the media presentation. For example, the media presentation generator 210 may indicate whether the received media segment should be played last, or alternatively, played before another media segment in the media presentation. Accordingly, each time a media presentation is updated (e.g., a media segment is added, removed, or modified), the media presentation generator 210 may update the media presentation file corresponding to the media presentation.

Because, in some embodiments, the media presentation generator 210 generates media presentations by linking media segments together (e.g., in a media presentation file), the media presentation generator 210 may include the same media segment in numerous media presentations without storing duplicate portions of the same media segment on the media presentation system 102 or on client devices. In other words, more than one media presentation file may link or point to the same media segment. For example, a user can user the same media segment in several media presentations, and the media presentation system 102 may only store the media segment once. As another example, multiple users may include the same media segment (e.g., a popular or trending media segment) in several different media presentations, and the media presentation system 102 may link to the same media segment in each of the several media presentations.

In an alternate embodiment, upon receiving a media segment that the media presentation system 102 identifies as corresponding to an existing media presentation, the media presentation generator 210 may create a new media presentation that creates a new content file that includes the existing media presentation content as well as the received media segment content. In this manner, each time a media segment is modified, updated, and/or removed, the media presentation generator 210 may create a new media presentation content file. Further, the media presentation generator 210 may overwrite or remove one or more previous versions of a media presentation content file when a media presentation is updated.

Additionally, the media presentation generator 210 may create both an updated media presentation file as well as an updated content file each time the media presentation generator 210 updates a media presentation with another media segment. For example, the updated media presentation file may point to the updated content file, as it is stored on the media presentation system 102. For example, the media presentation file may include a single link that points to the media presentation content file stored on the media presentation system 102. As another example, the media presentation file may include a link to the media presentation stored at another location, such as on a third-party site.

When generating a new media presentation with one or more media segments, the media presentation generator 210 may determine a title for the media presentation. For example, the media presentation generator 210 may suggest a title based on the users that contribute to a media presentation. Further, if the media presentation generator 210 detects a location and/or event associate with one or more media segment in the media presentation, the media presentation generator 210 may suggest the location as a title to the media presentation. In one or more additional embodiments, the media presentation generator 210 may provide or suggest a title for a media presentation based on a number of other factors or characteristics.

FIG. 2 also illustrates an authorization manager 212. In general, the authorization manager 212 can manage authorizations related to media presentation systems. Additionally, in one or more embodiments, the authorization manager 212 can manage a user's ability to contribute to a media presentation shared with the user. For example, the authorization manager 212 may determine whether a user is authorized to add a media segment to a media presentation shared with the user.

More specifically, the authorization manager 212 may determine whether a user is authorized to add a media segment to a media presentation shared with the user using a variety of factors. To illustrate, the authorization manager 212 may determine if a co-user that creates a media presentation has authorized the user to add a media segment to the media presentation. In another instance, the authorization manager 212 may determine if a contributor to the media presentation has authorized the user to add a media segment.

In one or more embodiments, for example, a user that creates a media presentation or contributes to a media presentation may specify with whom to share a media segment or a media presentation. In some embodiments, the user may have default sharing preferences. The authorization manager 212 may identify these sharing preferences for each media segment or media segment. In some cases, the authorization manager 212 may identify that the user indicated that the public at large is permitted to view and/or contribute to a media segment or a media presentation. In other cases, the authorization manager 212 may identify that the user indicated select users, or a select group of users, to permit to view a particular media segment or media presentation. For example, the authorization manager 212 may identify preferences that the user would like to share a media presentation with friends, co-workers, family members, and/or neighbors. Moreover, the authorization manager 212 may identify a custom list of co-users with whom the user has indicated to share a media presentation.

In additional or alternative embodiments, the authorization manager 212 may determine a user's authorization based a social networking relationship and/or affinity between users (e.g., based on an affinity coefficient between users meeting a predetermined threshold, which is described below). In some instances, the authorization manager 212 may authorize a user who receives a media presentation based on the user's social networking affinity to a creator and/or a contributor of the media presentation (e.g., "friends," "friends of friends," within a common group, etc.). For example, the authorization manager 212 may automatically determine that the user is authorized if the user is directly connected socially to a creator and/or a contributor of a media presentation via a social networking system.

If the authorization manager 212 determines that a user is authorized to add a media segment to a media presentation, the authorization manager 212 may provide an indication within or in connection with the media presentation before the media presentation system 102 shares the media presentation with other users. For example, the authorization manager 212 may include a set binary bit (e.g., set to "1") in a media presentation that is to be shared with a specific user indicating that the particular user is authorized to add a media segment to the media presentation. Otherwise, the authorization manager 212 may include an unset bit (e.g., set to "0") or null bit with the media presentation when the particular user is not authorized to add a media segment to the media presentation. As described below, a client device may provide a user the ability to add a media segment to a media presentation when the client device receives an indication that the user is authorized to add a media segment to the media presentation.

After determining authorization for a user, the authorization manager 212 may determine whether a user's authorization has changed since the media presentation was shared with the user. For example, the authorization manager 212 may determine that a user is not authorized to add a media segment to a media presentation shared with the user. As such, the media presentation system 102 provides the media presentation to a user to allow the user to access the media presentation as view-only. Subsequently, the authorization manager 212 may determine that the user is authorized to add a media segment to the media presentation. The media presentation system 102 may then notify the user, via the client device associated with the user, that the user is now authorized to add a media segment to the media presentation. Similarly, the media presentation system 102 may send a notification for a client device to remove the ability to add a media segment to the media presentation when the authorization manager 212 determines that the user no longer is authorized.

Additionally, or in the alternative to determining authorization at the time of providing or presenting a media presentation to a user, the authorization manager 212 may verify authorization of a user upon the media presentation system 102 receiving a media segment to add to a media presentation. For example, the authorization manager 212 may verify that the user is authorized to add the received media segment to the media presentation before the media presentation system 102 appends the media segment to the media presentation and distributes the appended media presentation. If the authorization manager 212 determines the user that submitted the media segment is not authorized to add a media segment to the media presentation, the authorization manager 212 may a send message to the user indicating that the user is not authorized to add a media segment to the media presentation.

In additional or alternative embodiments of the media presentation system 102, the authorization manager 212 may determine whether a user with whom a media presentation is shared can edit and/or remove a media presentation. Similar to adding a media segment described above, the authorization manager 212 may determine that a user can edit (e.g., remove a media segment, reorder the media segments, etc.) and/or remove a media presentation based on a number of factors, such as those factors described above.

As mentioned above, the media presentation system 102 includes a distribution manager 214. In general, the distribution manager 214 sends media presentations to users of the media presentation system 102. More specifically, the distribution manager 214 can distribute a media presentation generated by the media presentation generated 210 to users that are authorized to receive the media presentation. Once the distribution manager 214 determines to whom to distribute a media presentation, the distribution manager 214 may send the media presentation.

In some example embodiments, the distribution manager 214 communicates with the authorization manager 212 to identify which users are authorized to view particular media presentations. After communicating with the authorization manager 212 to identify co-users that are authorized to view and/or contribute to a media presentation, the distribution manager 214 may distribute the media presentation to the identified one or more users. For example, the distribution manager 214 may distribute the media presentation to a list of selected co-users with whom a user has selected to share the media presentation.

As described above, each media presentation may be associated with a media presentation file. The distribution manager 214 may send the media presentation file to the client device 104. In some embodiments, the distribution manager 214 may send the media presentation file in connection with one or more media segments that belong to a media presentation. For example, the distribution manager 214 may send a minimum of media segment (e.g., the first media segment, the first three media segments, all media segment, etc.) or a maximum number of media segments (e.g., no more than three media segments, no more than 20 megabytes worth of media segment) to the client device 104 when sending the media presentation file. If the distribution manager 214 is sending an updated file to the client device 104, the distribution manager 214 may include any updated media segments.

Alternatively, the distribution manager 214 may send the media presentation file without any accompanying media segments. In this case, the client device 104 may request one or more media segments when a user, via the client device 104, requests access to a media presentation (e.g., the user provides an interaction that indicates the user wants to watch a media presentation). In this manner, the distribution manager 214 may send a media presentation file or updates to a media presentation file without sending larger media segment files to the client device 104. Then when the client device 104 requests one or more media segments for a media presentation, the media presentation may send or stream the media segments to the client device 104.

To illustrate, the distribution manager 214 sends a media presentation file to client device 104 for a media presentation having a number of media segments. When a user on the client device views the media presentation and/or activates the media presentation (described below), the client device 104 may accesses the media presentation file and identify the media segments to request from the media presentation system 102. For instance, based on the media presentation file, the client device 104 may request that the distribution manager 214 send or stream the first media segment. As such, the distribution manager 214 accesses the media segments, for example, from the media presentation database 216, and provides the first media segment to the client device 104. While the user continues to watch the first media segment, the client device may, based on the media presentation file, identify a second media segment as being the next segment in the media presentation, and request the media presentation system 102 send the second media segment. Again, upon receiving the request, the distribution manager 214 may provide the second media segment to the client device 104. As such, the client device 104 may receive each media segment upon request, which may help a user preserve data transfer limits associated with the client device 104.

As mentioned above, in some example embodiments, the media presentation system 102 may create a single file for a media presentation rather than logically linking together numerous media segments. In these embodiments, when a client device 104 requests the media presentation, the distribution manager 214 may access the media presentation in the media presentation database 216 and provide the media presentation, or a portion thereof to the client device 104. Further, rather than sending the entire media presentation, the distribution manager 214 may stream relevant portions of the media presentation to the client device 104 upon the client device sending a request for the media presentation.

Additionally, or alternatively, upon the media presentation system 102 receiving a media segment from a client device that is to be added or appended an existing media presentation, the media presentation system 102 may distribute the received media segment to other client devices that currently include the media presentation. Specifically, in one or more embodiments, after the media presentation system 102 identifies the media presentation to which the received media segment corresponds, the distribution manager 214 may identify the client devices (or users associated with the client devices) that have the existing media presentation and send the media segment to the identified client devices. In addition, as described above, the media presentation system may generate instructions to append a received media segment to an existing media presentation. In this case, the distribution manager 214 may send the instructions along with the newly received media segment to the identified client devices.

In addition to distributing media presentations created by users, the distribution manager 214 can distribute system-based media presentations. To illustrate, the distribution manager 214 may detect when a user first accesses the media presentation system 102 (e.g., the distribution manager 214 may recognize the user as a "new user"). In response, the distribution manager 214 may provide a tutorial to the new user on how to use the media presentation system 102. Specifically, the distribution manager 214 can provide a tutorial, in the form of a media presentation, to the new user that provides directions on how to create and share media presentations with other users of the media presentation system 102. The distribution manager 214 can also distribute other system-based media presentations, such as media presentations that include announcements and updates about the media presentation system 102.

Further, the distribution manager 214 can distribute media segments and/or media presentations through a variety of distribution channels. For example, in addition to distributing media presentations to users of the media presentation system 102, in some example embodiments, the distribution manager 214 can distribute media presentations to another system, such as a social networking system. For instance, the distribution manager 214 may distribute a media presentation that a user creates through a social networking system to one or more of the user's social networking connections (e.g., directly or through a plug-in that integrates the media presentation system 102 in the social networking system). In some cases, the distribution manager 214 may post a media presentation on the newsfeeds of one or more social networking users connected to the users via the social networking system. In some example embodiments, the media presentation system 102 may allow other users to reply (e.g., add a media segment) the media presentation via the social networking system. Additionally, in some embodiments, the media presentation system 102 may integrate with the social networking system and allow users of the social networking system to create, edit, and/or add to a media presentation from within the social networking system (e.g., directly or through a plug-in).

As shown in FIG. 2 the media presentation system 102 includes a media presentation database 216. The media presentation database 216 may store media segments and/or media presentations. The media presentation database 216 can also store metadata associated with media presentations, such as the number of users that have accessed or viewed each media presentation, the creator or contributors of each media presentation, date information associated with each media presentation, authorization information, user preference information, and any other information associated with media presentations.

In addition to the media presentation database 216, and as shown in FIG. 2, the media presentation system 102 can include the user profile database 218. The media profile database 218 may store user information corresponding to each user in the media presentation system 102. The user profile database 218 may include a user profile for each user of the media presentation system 102. A user profile may include, but is not limited to, biographic information, demographic information, behavioral information, social information, or other types of descriptive information, such as work experience, educational history, hobbies or preferences, interests, affinities, and/or location information.

In addition to storing user information, the user profile database 218 may store user relationship information between users with the media presentation system 102. The user relationship information may indicate users who have similar or common work experience, group memberships, hobbies, educational history, and/or are in any way related or share common attributes. The user relationship information may also include user-defined relationships between different users and content (e.g., user defined friends, groups, etc.).

Further, the user profile database 218 may store authorization information and preference setting information associated with each user. For example, the media presentation system call allow a user to set default authorization preferences (e.g., via a user preference setting interface). Example user preference settings can relate to user-defined default authorizations to apply to media presentations that a user creates. In one or more embodiments, for example, a user can define default authorizations to apply to media presentations based on a co-user relationship with the user, based on characteristic of a co-user, such as age, or based on other characteristic or combination of characteristics of a co-user and/or the media presentation.

In addition to the various bases of authorization settings, example preference settings can relate to various types of authorizations. In particular, example types of authorizations include, but are not limited to, viewing authorizations, appending authorizations, editing authorizations, commenting authorizations, sharing or forwarding authorizations, and/or other types of authorizations that may limit the types of actions co-users can take with respect to media presentations that the user creates.

For example, a user can define default user preferences to include an authorization setting to allow anyone with whom the user shares a media presentation to add a media segment to the shared media presentation. In such a case, the media presentation system 102 (e.g., the authorization manager 212) can access the user's preferences and apply the authorization setting to a media presentation each time the user shares a media presentation. In one and more embodiments, the user can override the user-defined default preferences in the event the user wishes to share a media presentation with authorizations that are different than those defined in the user preferences.

In addition to the above, in one or more embodiments, a user can set user preferences on a user-per-user basis. For example, a user can individually select one or more users that are authorized to append media segments to media presentations created by the user. In addition, the user can select one or more users that can view, edit, remove, and/or forward media presentations the user creates. For instance, a supervisor user (e.g., parent user) can setup or otherwise manage a junior user's preference settings (e.g., a child user) such that the supervisor user always can view media presentations created by the child user, as well as having authorization to edit, remove, or otherwise manage media presentations or media segments the junior user creates. In one or more embodiments, the supervisor user can lock the junior user's preference settings with respect to the supervisor user (e.g., with a password).

Returning to FIG. 2, the media presentation system 102 may communicate with any number of client device(s) 104. For purposes of explanation, only one client device 104 will be described, but it is understood that the principles described can be applied to a plurality of client devices associated with any number of users. As illustrated in FIG. 2, the client device 104 can include, but is not limited to, a user input detector 220, a user interface manager 222, a media segment creator 224, a media presentation manager 226, and a storage manager 228.

Each component of the client device 104 may be implemented using a computing device including at least one processor executing instructions that cause the client device 104 to perform the processes described herein. In one or more embodiments, the various components are implemented using one or more applications installed and running on the client device 104. In some embodiments, the components of the client device 104 can be implemented by a client device alone, or across multiple computing devices. Although a particular number of components are shown in FIG. 2, the client device 104 can include more components or can combine the components into fewer components (such as a single component), as may be desirable for a particular implementation.

The user input detector 220 can detect user interactions with a user interface to determine user input (e.g., detecting a touch gesture on a touch screen corresponding to an interactive element of the user interface). More specifically, the user input detector 220 can detect, identify, and/or receive user interactions and translate user interactions into a user input (e.g., a user command or request). As referred to herein, a "user interaction" means a single interaction, or combination of interactions, received from a user by way of one or more input devices. In some embodiments, the user input detector 220 can translate a combination of user interactions as a single user input and/or translate a single user interaction into multiple user inputs.

For example, the user input detector 220 can detect a user interaction from a keyboard, mouse, touch screen, or any other input device. In the event a touch screen is used as an input device, the user input detector 220 can detect one or more touch gestures (e.g., swipe gestures, tap gestures, pinch gestures, or reverse pinch gestures) that a user provides to the touch screen. In one or more embodiments, a user can provide one or more touch gestures in relation to and/or directed at one or more graphical objects, items, or elements of a user interface presented on a touch screen. The user input detector 220 may additionally, or alternatively, receive data representative of a user interaction. For example, the user input detector 220 can receive one or more user configurable parameters from a user, one or more user commands from a user, and/or any other suitable user input.

As mentioned above, client device 104 can include a user interface manager 222. In one or more embodiments, the user interface manager 222 can utilize user input and/or other data received from a user (or source simulating user input) to manage, control, and/or facilitate the use of a user interface. In general, the user interface manager 222 can facilitate the presentation (e.g., by way of a display screen associated with a client device 104) of a graphical user interface (or simply "user interface") for purposes of allowing a user to access the features and benefits of the media presentation system 102. In particular, and in response to the user input (e.g., detected by the user interface detector 220), the user interface manager 222 can allow a user to control a user interface to view, navigate, browse, search, edit, contribute to, share, and/or otherwise experience media presentations. Further, the user interface manager 222 can display graphical elements that a user interacts with in navigating media presentations in a media presentation feed as well as capturing a media segment to include in a media presentation.

To illustrate, the user interface manager 222 can provide a user interface that facilitates the display of one or more media presentations and/or graphical elements on the client device 104 (e.g., on a display screen). In one or more embodiments, the user interface manager 222 can present a user interface as a user navigates within a media presentation feed. Further, the user interface manager 222 can change the display of the user interface as a user scrolls through a media presentation feed, by providing one or more swipe gestures to a touch screen as described above.

In one or more embodiments, the user interface manager 222 can display a thumbnail or preview of a media presentation to represent to the media presentation. For example, the user interface manager 222 can display an image (e.g., a representative frame) from a media presentation, such as the first image of media segment to represent the media presentation. Alternatively, the user interface manager 222 may display the image of the last played frame or first unplayed frame to represent the media presentation.

In some example embodiments, a user can interact with a media presentation feed by providing, via a touch screen displaying a user interface, one or more vertical swipe gestures directed toward the media presentation feed, as will be further discussed below with respect to FIGS. 3A-5F. In alternative embodiments, the user interface manager 222 can allow a user to navigate a media presentation feed using other navigation techniques, such as flipping through media presentations (e.g., turning a graphical representation of a page with each page corresponding to a different media presentation).

In addition to allowing a user to manually navigate or browse a media presentation feed, the user interface manager 222 can present a media presentation to the user. In particular, the user interface manager 222 can play a media presentation, including one or more media segments, on the display of the client device 104. As described below, the media presentation manager 226 may provide media segments and/or media presentations for the user interface manager 222 to display.

In one or more embodiments of the user interface manager 222 can cause the client device 104 to present a search interface that allows a user search for specific media presentations based on a variety of user input that may relate to characteristics of media presentations. In one or more embodiments, for example, a user can search for media presentations based on media presentation creator (e.g., a user name or identifier), media presentation content (e.g., users tagged in the presentation, topic of presentation), title of a media presentation, date associated with a media presentation, and/or any other identifiable characteristic of a media presentation. For example, the user interface manager 222 can provide a query input field, a display of suggested search terms, and/or provide a modified feed of media presentations based on resultant media presentations identified in response to the user's search query.

In addition to allowing a user to browse, search or otherwise navigate a plurality of media presentations within a media presentation feed, in some example embodiments, the user interface manager 222 may present a notification to a user when a media presentation is posted or updated. The interface manager 222 may present the notification as an alert, message, banner, icon, sound, etc. Further, the interface manager 222 may only display a limited number of notifications as well as display notifications for only certain media presentations, such as for media presentations that the user is participating in, or from co-users whom the user is following, etc.

In some example embodiments, the interface manager 222 may display a live image or video currently being captured by the client device 104. For example, when a user is capturing a media segment, the interface manager 222 may display the media segment as the media segment is being captured. The interface manager 222 may also display user interface elements on the display in connecting with the user capturing a media segment, as described below in FIGS. 4A-4D.

As illustrated in FIG. 2 and as mentioned above, the client device 104 includes a media segment creator 224. In general, the media segment creator 224 assists a user in capturing or otherwise obtaining a media segment to add to a media presentation. For example, the media segment creator 224 can use the client device 104 to capture a media segment. Alternatively, the media segment creator 224 may assist a user in selecting a previously stored media segment.

To illustrate, in some example embodiments, the media segment creator 224 can use a camera and/or microphone on the client device 104 to capture an image, video, and/or audio (See FIGS. 4A-4D). For instance, a user may capture a digital photo using the client device 104 or may record a video with audio using the client device 104. As discussed below in additional detail, the user can view or replay the captured media segment and choose to accept and share the media segment within a media presentation, or can delete or recapture the media segment.

Rather than capturing a new media segment, the user can use the media segment creator 224 to obtain an existing image, video, and/or audio segment to add to a media presentation. For example, the media segment creator 224 may allow a user to select a media segment stored on the user's client device. Additionally or alternatively, the media segment creator 224 may allow the user to select a media segment stored on a network device or online (e.g., a media segment accessible on cloud storage).

In some example embodiments, the media segment creator 224 can provide the ability for a user to edit and/or modify a captured video. For instance, the media segment creator 224 may allow a user to edit a captured image or video. Examples of editing include applying themes, coloring, modifying the runtime of a media segment, adding text or graphics, etc. To illustrate, the media segment creator 224 may facilitate one or more options for a user to add text to a media segment. As another illustration, the media segment creator 224 may allow a user to define the duration of a captured video, or extract a portion of a video to capture a media segment.

The media segment creator 224 may also provide a user the ability to capture a media segment from a media presentation shared with the user. For example, the media segment creator 224 may allow a user to mark a media segment as the user views a media presentation. In some example cases, the media segment creator 224 may allow the user to add the marked media segment to another media presentation, such as a media presentation created by the user or a media presentation shared with the user to which the user can add a marked media segment.

Upon capturing a media segment, the media segment creator 224 may store the media segment on the client device 104 and/or on a network device or online (e.g., a media segment accessible on cloud storage). For example, the media segment creator 224 may store the media segment in the media presentation database 216, described below. Further, the media segment creator 224 may provide a copy of the media segment to the media presentation system 102, as described above.

As mentioned above, the media presentation system 102 includes a media presentation manager 226. In general, the media presentation manager 226 organizes media presentations within the media presentation feed as well as organizes media segments within each media presentation. Further, the presentation manager 226 facilities the presentation of one or more media presentations to a user in response to user input. In addition, the presentation manager 226 assists a user in managing media presentations. For example, the media presentation manager 226 can add media segments to a media presentation. Further, the media presentation manager 226 can enable the user to set conditions, permissions, and/or restrictions on media presentations. Additional detail regarding the media presentation manager 226 will now be provided.

The presentation manager 226 may organize media presentations within a media presentation feed based on information received from the media presentation system 102. For example, the presentation manager 226 may arrange media presentations in the media presentation feed according to recency of each media presentation. To illustrate, when a new media presentation is shared with a user, or when a previously shared media presentation is updated, the presentation manager 226 may arrange the new or updated media presentation before older media presentations. Alternatively, the presentation manager 226 may arrange the media presentation feed based on other criteria, such as media presentation title, creator, age of the media presentation, presentation length, contributors, number of contributors, indication as a favorite, popularity (e.g., number of viewers), etc. In some example embodiments, the presentation manager 226 can enable a user to define, through user preferences, how the presentation manager 226 organizes and arranges the media presentation feed.

In addition to organizing media presentations within a media presentation feed, the presentation manager 226 can also organize media segments within a media presentation. For example, the presentation manager 226 may move a media segment in a media presentation to the end of the media presentation based on the number of times a user views the media segment. For example, if a user views a media segment a threshold number of times, the presentation manager 226 may modify a media segment presentation order so that the media segment plays after other media segments in the media presentation that the user has viewed less. In this manner, the presentation manager 226 may allow the user to view less-viewed or unviewed newly added media segment without having the user always view media segments that the user has previously viewed a number of times.

As another example, the presentation manager 226 may filter out a media segment from a media presentation that the user has viewed x number of times by the user. For instance, the presentation manager 226 may skip presentation of the frequently viewed media segment, or move presentation of the media segment to the end of the media presentation when the user has viewed the media segment a threshold number of times.

Further, the presentation manager 226 may update a media presentation upon receiving modifications and/or changes from either a user or the media presentation system 102. For example, if a user deletes, edits, or adds a media segment to a media presentation, the presentation manager 226 may reflect the deletion, edit, or addition to the media presentation in the media presentation feed. In addition, the media presentation manager 226 can send information or data regarding the modification of the media presentation feed to the media presentation system 102, and the media presentation system 102 can distribute the modification to other users. Similarly, when the media presentation system 102 sends an updated media segment to the client device 104, the presentation manager 226 may incorporate the updated media segments into corresponding media segments. Further, when the media presentation system 102 sends information to update or delete a media segment in a media presentation, the presentation manager 226 apply the modification to the media presentation.

While the presentation manager 226 generally provides a single media presentation feed, in an alternate embodiment, the presentation manager 226 may provide numerous media presentation feeds on the client device 104. For example, the presentation manager 226 may present a media presentation feed of media presentations shared among friends and another media presentation feed of media presentations shared among family members. To further illustrate, the presentation manager 226 may provide numerous media presentation feeds that are arranged by category, theme, topic, creator, contributors, date created, etc.

As mentioned above, the presentation manager 226 facilities the presentation of one or more media presentations to a user in response to user input. To illustrate, a user may desire to view a media presentation on the client device 104. For example, a user may navigate to a first media presentation within a media presentation feed. Upon navigating to the first media presentation, the media presentation manager 226 may begin to play the first media presentations on the client device 104. For instance, the media presentation manager 226 may start to play the first media segment and continuously play through each media segment in the first media presentation. In some instances, the presentation manager 226 may continuously replay or loop a media presentation until a user provides input to stop playing the media presentation. Alternatively, the presentation manager 226 may stop playing a media presentation after playing through the media presentation once, or after a number of predetermined times (e.g., three times).

As the user scrolls or navigates through media presentations in a media presentation feed, the presentation manager 226 may determine when to initiate or pause the playing of a media presentation. The presentation manager 226 may play the media presentation with audio (if available) or without audio until the user requests to hear the audio.

In general, the presentation manager 226 only plays one media presentation at a time. For example, the presentation manager 226 may fully display one media presentation to the user at a time and thus plays the fully displayed media presentation. In some example embodiments, however, the presentation manager 226 may be able to fully display more than one media presentation to a user. In these embodiments, the presentation manager 226 may determine which media presentation to play (e.g., the media presentation that was fully displayed last) or allow the user to indicate which media presentation to play. For example, a graphical user interface can include an activation area within which a media presentation can be activated (e.g., played) when a user positions a representative frame of the media presentation in the activation area, as will be described in below.

If a user navigates to a second media presentation while the presentation manager 226 is presenting (e.g., playing) the first media presentation, the presentation manager 226 may pause the first media presentation upon the user navigating to the second media presentation. Upon the user navigating to the second media presentation, the presentation manager 226 may begin to play the second media presentation. In this manner, as a user navigates through a media presentation feed, the presentation manager 226 may play various media presentations as each media presentation is presented to the user.

If the user subsequently navigates back to the paused first media presentation, the presentation manager 226 may pause the second media presentation and begin playing the first media presentation from where presentation manager 226 previously paused the first media presentation. Thus, when a user navigates away and back to a media presentation, the presentation manager 226 may present the media presentation in a manner that allows the user to experience the media presentation as one continuous experience. Further, the presentation manager 226 allows the user to progress through the entire media presentation without requiring the user to restart the media presentation.

The presentation manager 226 may determine when to play or pause a media presentation in a media presentation feed based on the location of the media presentation within the user interface display of the client device 104. For example, the presentation manager 226 may determine when a media presentation enters into an activation area of the user interface and/or a deactivation area of the user interface. In some instances, the activation area is large enough to fully display a media presentation (i.e., not cut off the top edge or bottom edge of the media presentation). In these instances, the media presentation may activate (e.g., start playing) when a predefined portion (e.g., 70%, 80%, 90% or 100%) of the media presentation enters into the activation area.

In other instances, the activation area may be a point, line, or location of the user interface. Here, the media presentation may trigger the activation area when an edge (or other portion) of the media presentation passes over, overlaps, coincides, or otherwise matches the range of the activation area. For example, the user interface may have a top activation boundary (e.g., a line) and a bottom activation boundary, and a media presentation activates when the top of the media presentation passes over and below the top activation boundary or the bottom of the media presentation passes over and above the bottom activation boundary. Further, the media presentation may deactivate when the top of the media presentation passes over and above the top activation boundary or the bottom of the media presentation passes over and below the bottom activation boundary. FIGS. 5A-5F below provide further illustration of media presentations activating and deactivating based on a media presentation's location relative to an activation area. In some example embodiments, the activation area may be an enclosed area within the user interface, such as a corner area, or another designated area within the user interface.

Further, the presentation manager 226 may facilitate playing, pausing, skipping, and/or repeating, media segments, or portions of media segments, within a particular media presentation in response to user input. Specifically, in response to the media presentation system 102 detecting touch gestures, the media presentation manager 226 can provide navigational features based on the detected touch gesture. For example, if a user provides a right-to-left swipe gesture, the media presentation manager 226 can repeat the previously played media segment. As another example, if a user provides a tap gesture, the media presentation manager 226 can skip the remaining portion of the media segment currently playing and begin playing the next media segment in the media presentation. Thus, if a media presentation includes a number of media segments, the media presentation manager 226 can allow a user to quickly navigate among the media segments.

In additional example embodiments, in response to a user providing a double tap gesture, the media presentation manager 226 can pause the media presentation. In yet another example, if a user provides a left-to-right swipe gesture, the media presentation manager 226 can provide an information page regarding the current media segment or media presentation (e.g., information associated with the user that contributed a particular media segment, details of the media segment such as date created, length, etc.). The above example gestures are provided as examples only, and one or more embodiments can include the same or additional gestures associated with the same or other functionality, as described herein.

When the presentation manager 226 pauses a media presentation due to user navigational input, the presentation manager 226 may display an image of the last played frame or next unplayed frame of the media presentation to represent the media presentation. In this manner, the user can visually see the current position of a media presentation that is not actively playing. Further, when a user navigates back to the paused media presentation, displaying an image of the last played frame or next unplayed frame of the media presentation can help the user transition back into the presentation of the media presentation as the presentation manager 226 resumes play of the media presentation.

As mentioned above, the media presentation system 102 may provide search functionality that allows a user to search or discover media presentations not currently shared with the user. For example, the presentation manager 226 may enable a user to discover popular, trending, or featured media presentations that users of the media presentation system 102 have made public. For instance, the presentation manager 226 may enable a "discover tab" that a user may select to view one or more popular, trending, or featured media presentations. In addition, the presentation manager 226 may allow a user to discover other media presentations by creator demographics (age, residency, nationality, etc.) title, topic, channel, category, recency, popularity (e.g., number of viewers), trends (e.g., within the last hour, 12 hours, 24-hours, or another specified amount of time), location, interests, etc. In some instances, the media presentation system 102 may automatically generate discoverable media presentations. The user and/or the media presentation system 102 may specify an ephemeral or lasting discovery time period for media segments and/or media presentations, such as within the last hour, 12 hours, 24-hours, or another specified amount of time. In other instances, an administrator or editor (e.g., a human curator) associated with the media presentation system 102 or associated with a third-party (e.g., a social networking system or messaging application) may select one or more discoverable media segments and/or presentations.

In addition to allowing users to search and discover other publicly available media presentations, in some example embodiments, the presentation manager 226 may enable a user to discover media presentations of other users of the media presentation system 102 that are in a specified proximity of the user. For example, if the user is at an event, the presentation manager 226 may allow the user to discover media presentations from other users at the event. Further, the presentation manager 226 may enable a user to discover other users who are at, or have created a media presentation at a particular location, such as a park, school, point of interest, etc.

In one or more embodiments, the presentation manager 226 may provide a user with additional information about co-users of the media presentation system 102. For example, the presentation manager 226 may generate a list of co-users who have contributed to a media presentation. Further, the presentation manager 226 may facilitate the user to see a list of other co-users when the user searches the media presentation system 102. Upon selecting a co-user, the presentation manager 226 may present, to the user, a user profile of the selected co-user, along with other information about the selected co-user.

The presentation manager 226 may also allow a user to tag as a favorite or mark media presentations or media segments within a media presentation. For instance, the presentation manager 226 may compile a media presentation that includes media segments that the user has tagged as favorite media segments. The presentation manager 226 may enable the user to share the favorites media presentation with other users. Alternatively, the presentation manager 226 may not provide the option to a user to share the favorites media presentation with other users.

The presentation manager 226 can also allow a user to "like" individual media segments within a media presentation as well as "like" the media segment as a whole. By indicating a preference for one or more media segments within a media presentation, the creator of the media presentation can promote (e.g., move up) a well-liked media segment with a media presentation or remove a media segment altogether that receives little or no likes after a set number of views.

In addition to adding a "like" to a media segment or a media presentation, the presentation manager 226 may allow a user to preserve, or lock, a media presentation as it had been presented to the user. For example, if a user forwards a media presentation to a co-user to view the media presentation, by the time the co-user views the media presentation, the media presentation may have changed due to additional media segments being added to the media presentation. As such, in some example embodiments, the user may select particular media segments, or lock a media presentation as presented to the user, and share the selected or locked media presentation to co-users, or add the locked media presentation to their profile. In this manner, the user may provide the same media presentation to co-users without worry that the media presentation will change before the co-users have an opportunity to view the media presentation.

Along similar lines, the user may desire to view media segments within a media presentation from a set duration of time. As such, the presentation manager 226 may enable the user to filter which media segments the presentation manager 226 presents to the user. For example, the user may specify to view media segment from a media presentation that were added to the media presentation around a specific time period, such as media segments added in the last 24-hours, media segments added on January 24, or media segments added between 8:00 am on March 25 and 5:00 pm March 27.

As mentioned above, the presentation manager 226 can assist a user in managing media presentations. To illustrate, when a user captures a media segment to add to a media presentation shared with the user, the media presentation manager 226 may append the captured media presentation on the client device 104. As such, the media presentation manager 226 updates the media presentation shared with the user to include the captured media segment. In addition, the media presentation manager 226 may send a copy of the captured media segment to the media presentation system 102, as described above. Alternatively, the media presentation manager 226 may send an updated copy of the media presentation to the media presentation system 102 that includes the captured media segment in the media presentation.

Just as the media presentation manager 226 can send a media segment to the media presentation system 102, the media presentation manager 226 can receive media segments from the media presentation system 102. For example, the client device 104 may receive a media segment from the media presentation system 102 along with instructions to append or include the media segment to a media presentation currently shared on the client device 104. As such, the media presentation manager 226 may append the received media segment to the corresponding media presentation currently on the client device 104. In this manner, the media presentation manager 226 on each client device may each append media segments to media corresponding presentations regardless of if the media segment was captured locally by the client device 104 or captured from a co-user via another client device and provided to the client device 104 by the media presentation system 102.

In addition to appending media segment to media presentations, in some example embodiments, the media presentation manager 226 may enable a user who creates or manages a media presentation to control the arrangement of media segments within the media presentation. For instance, the media presentation manager 226 may allow the user to indicate a specific presentation order for media segments in the media presentation.

In addition to a user indicating a presentation order, the media presentation manager 226 may allow a user to specify that a particular media segment be presented in a particular manner. For example, if the user includes an advertisement media segment in a media presentation, the user may specify that the advertisement media segment always be presented last in the media presentation, even when other co-users add media segments to the media presentation. In some instances, the media presentation manager 226 may allow the user to specify if the media presentation should play media segments in a particular order, such as the media presentation playing media segments in the order in which the media segments were added, in reverse order, randomized. Additionally or alternatively, the media presentation manager 226 may enable a user who created the media presentation to instruct the media presentation manager 226 to always present specific media segments in the media presentation (e.g., the first media segment created by the user, a media segment that advertises a product, etc.), regardless of other rules and conditions imposed by the user.

Not only can a user that creates a media presentation provide preferences to the media presentation manager 226 for presenting a media presentation, a user who receives media presentations can specify viewing and presentation preferences. To illustrate, a user that receives one or more media presentations may specify to the media presentation manager 226 to play media presentations in a particular order (e.g., in the order in which the media segments were added, in reverse order, randomized). Further, the media presentation manager 226 may allow a user to specify that only media segments added in the last day, week, month, etc., be played when presenting the media presentation to the user. For instance, if a media presentation has fifty media segments, but only eight added in the last week, the media presentation manager 226 may allow the user to specify to display the last week of media segments when presenting the media presentation to the user. Similarly, the media presentation manager 226 may allow the user to request that the media presentation manager 226 only present media segments that meet a threshold number of likes from co-users (e.g., don't present any media segments that do not have over x likes after the first week and x+y likes after the second week).

In addition to enabling users to set presentation preferences, the media presentation manager 226 may provide a user with the ability to edit media presentations created or managed by the user. For example, using the media presentation manager 226, a user can edit a media presentation by adding a title to a media presentation. In some cases, the media presentation manager 226 can enable the user to modify an existing title of a media presentation. When adding or modifying a title of a media presentation, the media presentation manager 226 can allow the user to change the font, add a font color, and/or add graphics to the title (e.g., emojis, ideograms, or smileys, etc.).

As another example of providing a user the ability to edit a media presentation, the media presentation manager 226 may enable the user to remove one or more media segments from a media presentation. To illustrate, upon other co-users adding a media segment to a media presentation created by the user, the media presentation manager 226 can enable the user (i.e., the creator) to remove one of the media segments added by the other users. For example, the user may remove the media segment in response to viewing the segment and determining that the segment does not belong in the media presentation. Additionally or alternatively, the user may remove the segment in response to other users flagging the media segment for removal. For instance, one or more co-users may tag a media segment in the media presentation as inappropriate. In response, the user may review and remove the media segment using the media presentation manager 226.

The media presentation manager 226 may also enable a user who created a media presentation to specify which co-users can view the media presentation as well as which co-users can contribute (e.g., add a media segment) to the media presentation. More specifically, the media presentation manager 226 can enable the user to grant viewing access of the media presentation to one or more co-users. The user may grant access by selecting co-users such as individual co-users, a defined group of users (e.g., "friends," "family," "co-workers," "classmates," etc.), or the public at large to view the media presentation that the user created.

In addition to granting viewing rights, the media presentation manager 226 may assist the user is selecting and authorizing one or more co-users to add media segments to a media presentation created by the user. In some instances, the user can authorize the same co-users with whom the user is sharing the media presentation to add a media segment to the media presentation. Alternatively, the user may authorize a subset of co-users that can view the media presentation to add media segments to the media presentation. For example, the user may allow the public at large to view the media presentation, but only authorize co-workers to add media segments to the media presentation.

In some example embodiments, the media presentation manager 226 may provide the user a list of co-users to share a media presentation with and, in some cases, authorize to add media segments based on the user's social networking contacts. For example, the media presentation manager 226 may interface with a social networking system to identify potential social networking users with whom the user can share a media presentation. Further, the user may choose to share a media presentation with all social networking users directly and/or tangentially connected to the user, while allowing only "family" members to add to the media presentation. Further, in some instances, the media presentation manager 226 can share the media presentation via the social networking system if the user has selected one or more social networking users with which to share user-created media presentation.

In addition, the media presentation manager 226 can recommend other users with whom to share the media presentation based on a number of factors. For example, the media presentation manager 226 may recommend the user share a media presentation with co-users who are within a specified age range of the user. For example, if the user is a teenager, the authorization manager 212 may identify other teenagers and determine who among the identified teenagers are authorized to view the media presentation. In another embodiment, the media presentation manager 226 may identify the topic of the media presentation and recommend other users that share the same or similar topics. Further, the media presentation manager 226 may identify co-users who are proximate to the user.

Just as the user can authorize co-users to add media segments to a media presentation created or managed by a user, the user can remove or revoke authorization at any time. For example, a user can use the media presentation manager 226 to disable the ability of users to add media segment to a media presentation. For example, the user may turn off the ability of users to add media segments to a media presentation. In addition, the media presentation manager 226 may automatically disable the co-users' ability to add media segments to a media presentation. For example, the media presentation manager 226 may disable the co-users' ability to add a media segment to a media presentation when the time since the last media segment was added exceeds a duration of time (e.g., 3 days, a week, two weeks, a month, etc.), or when the media presentation has not been viewed for a duration of time.

When co-users are able to contribute to a media presentation shared by the user, in one or more embodiments, the media presentation manager 226 may provide the user with the ability to specify conditions that a media segment must satisfy before the media segment can be added to the media presentation created by the user. For example, the media presentation manager 226 may provide the user with a set of options that corresponds to various media presentation restrictions, and allow the user to choose one of more conditions that must be satisfied if a media segment is to be added to the media presentation created by the user. Examples of conditions include a maximum number of times a co-user can add a media segment to a media presentation, the total number of media segments allowed in the media presentation, the minimum or maximum length of time a video segment in the media presentation can be, the maximum length of the media presentation, the time frame a user has to add a media segment to the media presentation (e.g., a co-user cannot add a media segment after one week of the user posting the media presentation).

Further, the user may specify that media segment added to the media presentation satisfy a particular maturity rating level. For instance, based on the maturity rating level set by the user, the media presentation manager 226 may require that co-users post only media segments that are appropriate for all children 12 years of age and under. In another instance, the user may specify that co-users must be over 21 to view the media presentation and/or add a media segment to the media presentation. For instance, a co-user may need to authenticate (e.g., enter a password or otherwise verify themselves) before the co-user is shown the media presentation flagged with adult content.

Additionally, the media presentation manager 226 may allow a user who creates a media presentation to permit or authorize one or more co-users to edit and/or delete media presentations created by the user. For example, if the user is an entity (e.g., a business, company, or corporation), the user may authorize one or more co-users to edit media presentations created by the entity, such as approving media segments that co-users want to add to the media presentation created by the entity or deleting media segments tagged as inappropriate. While the user who creates a media presentation may authorize another user to manage and/or edit a media presentation created by the user, the user may restrict the other user's ability to delete a media segment and/or the media presentation. In other words, only the user that created the media presentation may be able to delete a media segment within the media presentation or the media presentation itself. Additionally, the media presentation manager 226 can enable a user who has extended permission to one or more co-users to revoke permissions at any time, or to only grant authorization for a limited time (e.g., permission expires after one week, if not renewed).

In addition to allowing a user to grant co-user permission to manage media presentations the user creates, in some example embodiments, the media presentation manager 226 may provide analytics to a user regarding media segments in a media presentation. For example, the media presentation manager 226 may indicate to a user the number of co-users that have viewed a media presentation created by the user. As another example, the media presentation manager 226 may provide the user the number of times a media segment has been liked, skipped, hidden, muted, removed, and/or replayed. For instance, when a media segment has been hidden or removed a threshold number of times (e.g., over 20 times, or by 60% of co-users that have access to the media presentation, etc.), the media presentation manager 226 may suggest to the user to remove the media segment from the media presentation. The media presentation manager 226 may provide additional analytics to the user to assist the user in improving a media presentation shared with other users.

In some example embodiments, the presentation manager 226 may allow a user to report a media segment as inappropriate. For example, a co-user may report that a media segment includes inappropriate content, such as content suitable only for adults. When a user flags a media segment as misappropriate, the presentation manager 226 may skip the media segment for the user that reported the media segment as inappropriate as well as for other co-users who have access to the media segment.

Similarly, the presentation manager 226 may also hide media segments within a media presentation that do not meet a maturity setting specified by a user. For example, a user may indicate that he or she does not want to view any content that contains mature material above a certain rating. As such, the presentation manager 226 may automatically skip media segments that are flagged by the creator or the media segment or by other viewers of the media segment as containing mature material. The presentation manager 226 may indicate to the user that a media segment has been skipped. Alternatively, the presentation manager 226 may remove the inappropriate media segment from the media presentation presented to the user having the maturity rating enabled.

Along the same lines, the presentation manager 226 may enable a viewing user to hide a media segment from a media presentation that the user does not want to view when re-watching a media presentation. Similarly, the presentation manager 226 may enable a user to hide, or remove a media presentation altogether from the user's media presentation feed. For example, the presentation manager 226 may present a media presentation that the user is not interested in viewing. In response, the user can select an option to archive, hide, and/or delete the media presentation from the user's media presentation feed. The presentation manager 226 may then remove the media presentation from the user's media presentation feed and not provide updates when other co-users add media segments to the removed media presentation.

As mentioned above, the user may be an entity. In some cases, the entity may be a marketer that provides advertisement campaigns via media presentations. For example, a company may encourage and provide incentives for users to create media presentations and/or capture media segments that show the user promoting a particular product. The media presentation manager 226 may assist the marketer in managing media presentations that include media segment captured by co-users (e.g., customers or potential customers). In addition, when co-users include an advertisement media segment from a marketer in their media presentations, the media presentation manager 226 may report the conversion rate of the advertisement media segment within the media presentations created by the co-users.

Further, the media presentation manager 226 can assist the marketer to selectively choose co-users with which to share a media presentation that contains advertisements. For example, the media presentation manager 226 may report to a marketer that a media presentation created by a co-user includes a group of co-users promoting a product for the marketer. The media presentation manager 226 may then identify other co-users who are connected to the co-users in the group of co-users. Based on the media presentation manager 226 identifying the other co-users, the marketer may share the media presentation that promotes a product to the other co-users. Upon viewing the media presentation, the other co-users will recognize one or more people in the media presentation promoting the marketer's product. Accordingly, the media presentation manager 226 can help a marketer create a personalized media presentation and share the media presentation to targeted co-users of the media presentation system 102 and/or a social networking system.

FIG. 2 also illustrates a storage manager 228. The storage manager 228 may include media presentations 230 and user preferences 232. For example, the storage manager 228 may store media presentations shared with the user associated with the client device 104 as well as media presentation system created by the user. The storage manager 228 may communicate with the media presentation system 102 to send media segments, media presentations, and/or user information between the client device 104 and the media presentation system 102. For instance, the storage manager 228 may receive one or more media segments from the media presentation database 216. Similarly, the storage manager 228 may send user preferences to the user profile database 218 on the media presentation system 102.

Figure 3A:
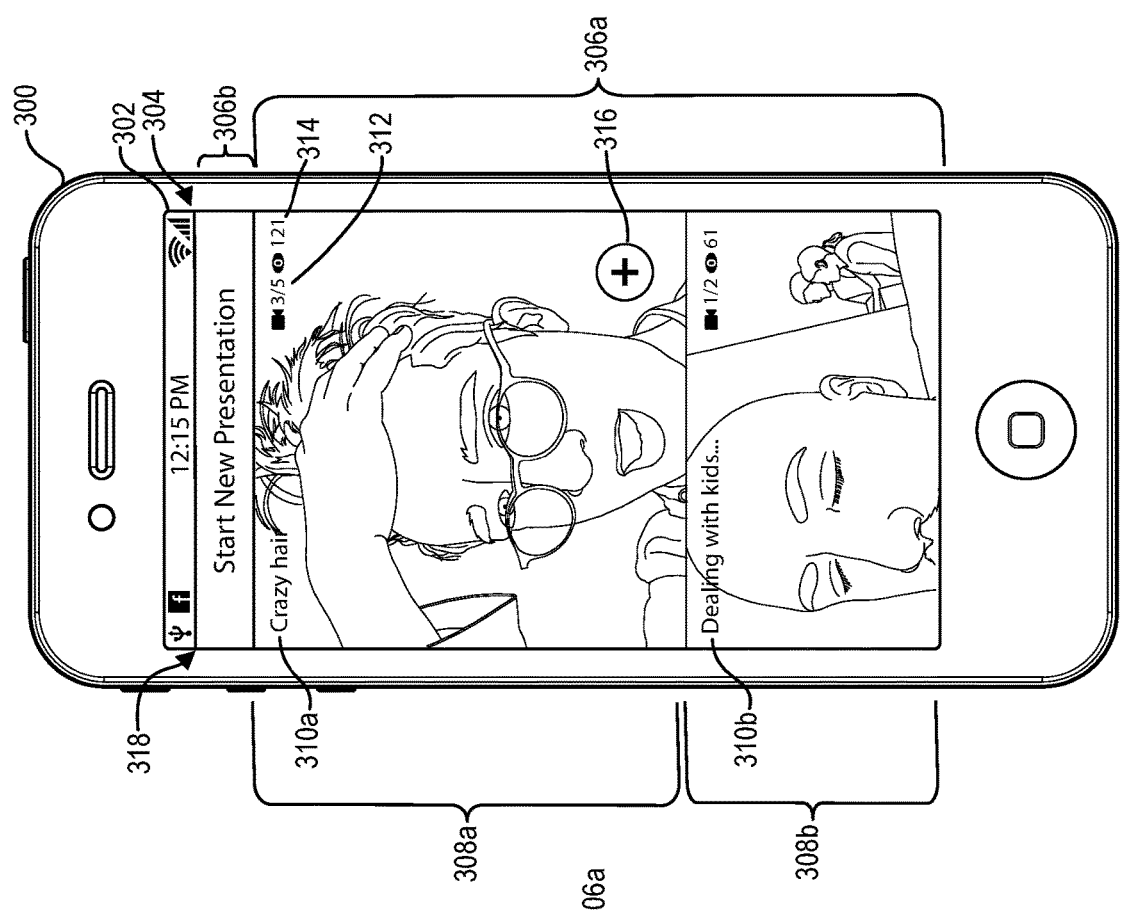
FIGS. 3A-3B illustrate an exemplary graphical user interface showing an example media presentation feed in accordance with one or more embodiments.
Figure 3B:
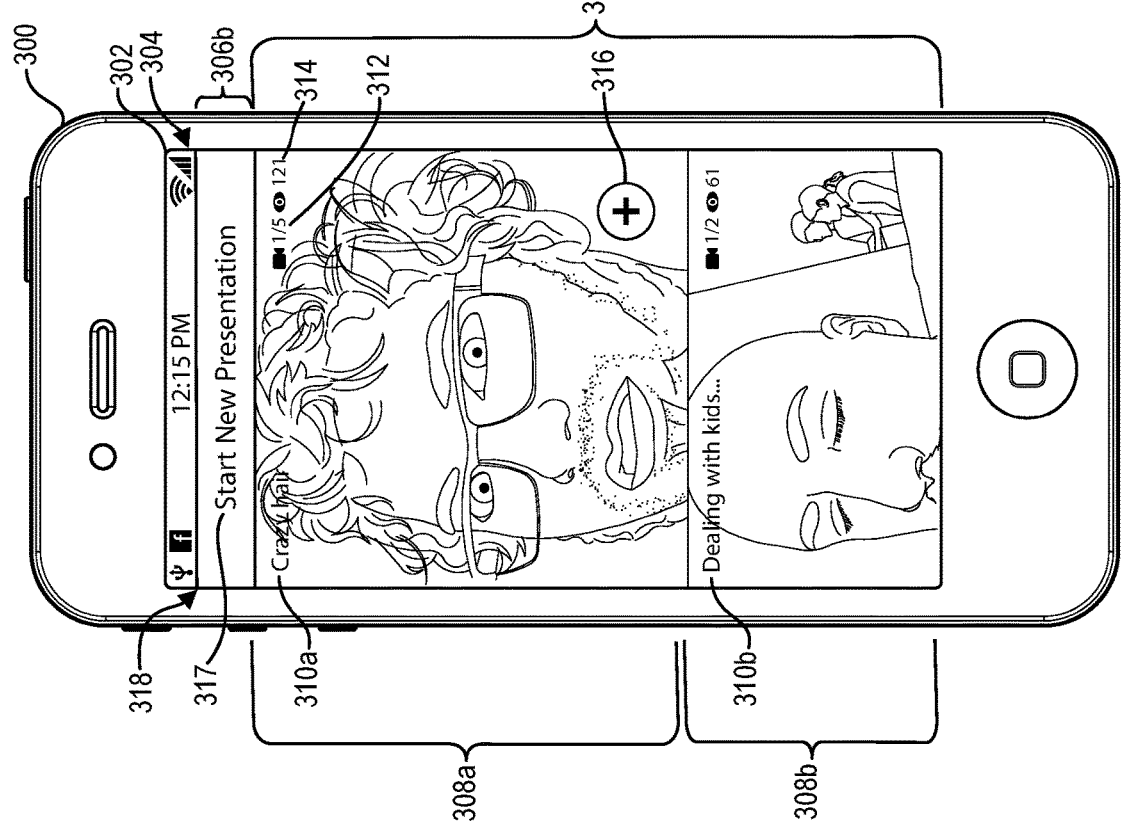

FIGS. 3A-3B illustrate an exemplary graphical user interface 302 showing an example media presentation feed 318 on a client device 300. In particular, FIGS. 3A-3B illustrate an example client device 300 displaying various views of a graphical user interface 302 (or "GUI 302") by way of a touch screen 304. The GUI 302 can be a graphical user interface for a mobile application. For example, the client device 300 can execute an application that facilitates interactions with the media presentation system 102 described in connection with FIG. 1.

Further, the client device 300 illustrated in FIGS. 3A-3B may be an example embodiment of the first client device 104a described in connection with FIG. 1. For example, the user 110 may use the client device 300 to interact with the media presentation system 102. Further, while the client device 300 of FIGS. 3A-3B illustrate a mobile device, one will appreciate that a media presentation application may be executed on other types of computing devices, such as the computing and client devices described below in connection with FIGS. 8-9.

The GUI 302 may include one or more graphical user interface areas that display content to a user. To illustrate, the GUI 302 may include a first graphical user interface area 306a (or "first area 306a") and a second graphical user interface area 306b (or "second area 306b"). The first area 306a and the second area 306b may move within the GUI 302 and, in some cases, moved out of the GUI 302. For example, as illustrated below in connection with FIGS. 5A-5F, the GUI 302 may display the first area 306a while the second area 306b may not be displayed in the GUI 302.

As illustrated in FIG. 3A, a user may utilize the client device 300 to view a media presentation feed 318 within the GUI 302. The first area 306a may display a media presentation feed 318 that includes one or more media presentations. To illustrate, FIG. 3A shows a first media presentation 308a and a second media presentation 308b. While FIG. 3 illustrates only two media presentations, the media presentation feed 318 may include any number of media presentations.

As user may scroll through media presentations, the boundaries of the first area 306a and the second area 306b may shift within the GUI 302. For example, the top boundary of the first area 306a and the bottom of the second area 306b may initially align with the top of the first media presentation 308a. As the user scrolls down to view additional media presentations, the second area 306b may disappear from the GUI 302 and the first area 306a may shift to the top of the GUI 302. When the user navigates back within the GUI 302 and the second area 306a again becomes visible, the first area 306a may shift down from the top of the GUI 302 to again align with to of the first media presentation 308a within the GUI 302. In some instances, the first area 306a does not include any media presentations. In these instances, the first area 306a may remain blank until one or more media presentations are shared with the user or until the user creates a media presentation. Alternatively, when no media presentations are available for the user to view, the client device 300 may display the second area 306b, discussed below, which provides an option for the user add a new media presentation.

As described above, the client device 300 may extract an image from a media presentation and represent the media presentation using the extracted image. The client device 300 may use an image of the last viewed frame or next unviewed frame of the currently displayed media segment to display in the first area 306a. To illustrate, FIG. 3A displays a representative frame from the first media presentation 308a of a man with glasses and facial hair to represent the first media presentation 308a. Similarly, the client device 300 displays a portion of a representative frame of a man with his eyes closed and two children in the background to represent the second media presentation 308b.

As illustrated in FIG. 3A, the client device 300 may display information associated with a media presentation. For simplicity, display information with respect to the first media presentation 308a will be described. It should be appreciated, however, that the same or similar types of display information can correspond to the second media presentation 308b or any other media presentation within the media presentation feed 318.

Returning to FIG. 3A, the client device 300 may display a title 310a associated with the first media presentation 308a. As illustrated in FIG. 3A, the title 310a overlays the first media presentation 308a. While the title 310a is displayed over the top right corner of the first media presentation 308a, one will appreciate that the title may be position over another portion of the first media presentation 308a. Further, the title may be hidden from display, for example, when the client device 300 is playing the first media presentation 308a.

Additionally, and as illustrated in FIG. 3A, the client device 300 may display a media segment count 312 associated with the first media presentation 308a. The media segment count 312 may indicate the current media segment being presented as well as the total number of media segments included in the first media presentation 308a. As the client device 300 plays the first media presentation 308a, the current media segment number may increment. Similarly, as user and/or co-users add media segments to the first media presentation 308a, the total number of media segments within the media presentation may increment. Further, if a media segment is removed or deleted from the first media presentation 308a, the total number of media segments may decrease. Likewise, if the client device 300 filters out one or more media segments from the first media presentation 308a (e.g., based on authorization), the client device 300 may display the total number of remaining media segments as the total number of media segments in the media segment count 312.

The client device 300 may also display a total number of views 314 in connection with each media presentation. For example, FIG. 3A illustrates that the first media presentation 308 has been viewed 121 times. The total number of views 314 may correspond to the total number of views for the media presentation. Alternatively, the total number of views 314 may correspond to the media segment currently being presented by the client device 300.

The client device 300 may display additional information and metadata associated with each media presentation. For instance, the client device 300 may display the number of "likes" for each media segment or for the media presentation. In another instance, the client device 300 may display an indication of whether a media segment or media presentation is a "favorite" of the user. Additionally or alternatively, the client device 300 may display the user who provided the current media segment and/or the creator of the media presentation. Further, the client device 300 may display a rating for the media segment being presented.

In addition, the client device 300 may also display one or more selectable elements in connection with a media presentation. As illustrated in FIG. 3A, the client device 300 displays a graphical selectable element, such as an add segment element 316 (e.g., a graphical button having a plus symbol) in connection with the first media presentation 308a. As described above, the client device 300, may determine, or may receive an indication from the media presentation system, whether a user associated with the client device 300 is authorized to add a media segment to the first media presentation 308a that the client device 300 is currently presenting to the user. If the user is authorized to add a media segment, the client device 300 may display the add segment element 316 to the media presentation being presented. As described in connection with FIGS. 4A-4B, a user may select the add segment element 316 when the add segment element 316 is displayed to add a media segment to the media presentation the user is viewing.

While FIG. 3A displays an add segment element 316 illustrated as a plus icon, one will appreciate that the add segment element 316 may be any type of graphic or icon. Additionally or alternatively, the client device 300 may provide the user the option to add a media segment to a media presentation, if authorized, using an option displayed at the end of the media presentation, or displayed elsewhere within the GUI 302.

A user may navigate between media presentations within the media presentation feed 318. For example, the user may use the touch screen 304 to navigate within the first area 306a to view additional media presentations within the media presentation feed 318. When the user positions (e.g., by scrolling the media presentation feed 318) a media presentation in an activation area, the client device 300 can initiate the playing of the media presentation. To illustrate, FIG. 3A shows the client device 300 presenting the first media presentation 308a to a user. In presenting the first media presentation 308a, the client device 300 may play the first media segment in the first media presentation 308a (e.g., the media segment counter 312 shows "1/5" signifying the first media segment out of five media segments). Accordingly, FIG. 3B illustrates the first media presentation 308a playing another media segment in the first media presentation 308a (e.g., the media segment counter 312 shows "3/5" signifying the third media segment out of five media segments). Accordingly, the client device 300 may play the first media presentation 308a when the first media presentation 308a is shown on the display of the client device 300 and/or when the user navigates to the first media presentation 308.

As described above, FIG. 3A illustrates the second area 306b (i.e., the second graphical user interface area 306b). The second area 306b may include a selectable new presentation option 317 that allows a user to initiate a new media presentation. For example, FIG. 3A displays the new presentation option 317 (labeled "Start New Presentation") in the second area 306b. Upon selecting the selectable new presentation option 317 in the second area 306b, the client device 300 may assist the user in creating a media presentation, as will be described below with reference to FIGS. 4A-4D.

Figure 4D:
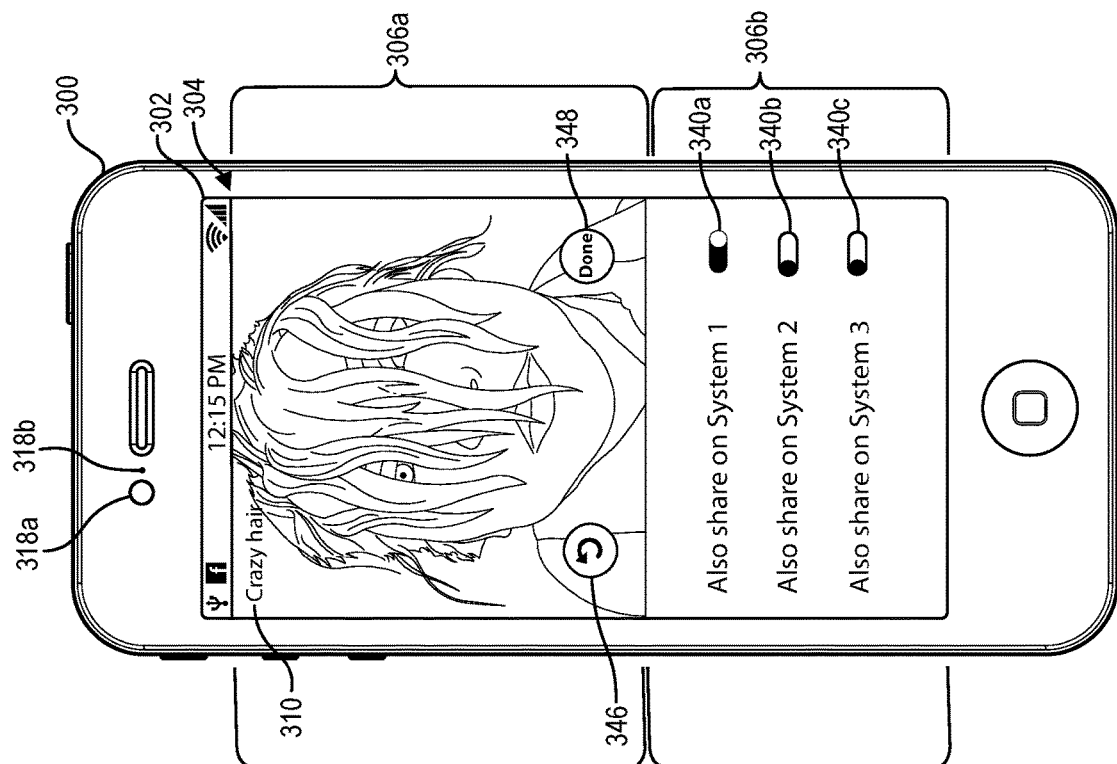
Figure 4C:
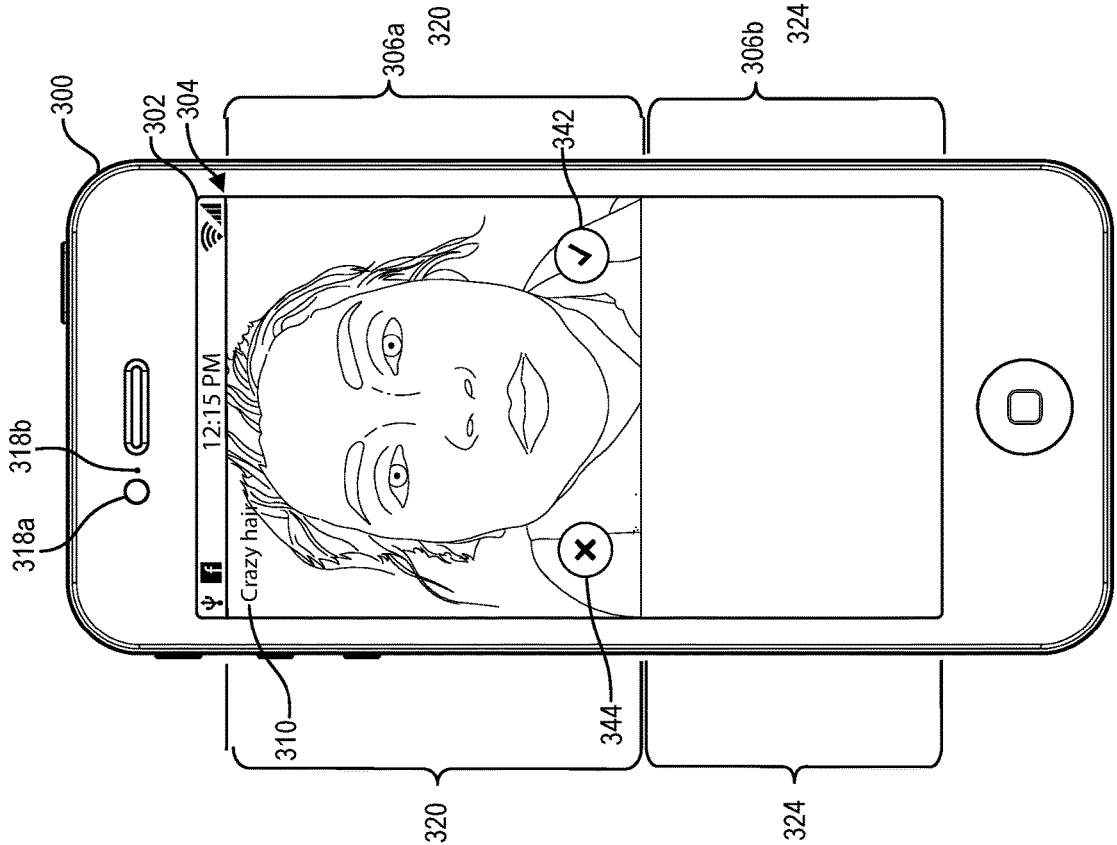

As mentioned, a user may select an option to create a new media presentation (e.g., selecting the new presentation option 317), which consists of the user creating a media segment to include within a media presentation. Similarly, when displayed within a media presentation, the user can select the add segment element 316 to add a media segment to the media presentation the user is viewing. Accordingly, FIGS. 4A-D shows an exemplary graphical user interface 302 of the process of capturing a media segment to add to a media segment (new or existing) using the client device 300. In particular, FIG. 4A illustrates setting up a new media presentation while FIGS. 4B-4D illustrate the process of capturing a media segment to add to either a new media presentation or an existing media presentation. One will appreciate that the client device 300 displayed in FIGS. 4A-4D may be embodiments of the client device 300 illustrated in FIGS. 3A-3B.

As mentioned above and as shown in FIGS. 3A-3B, a user may select the selectable new presentation option 317 to start a new media presentation to share with one or more co-users, as described above. Part of creating a new media presentation may involve providing a title for the new media presentation. As illustrated in FIG. 4A, when creating a new media presentation, the client device 300 may provide a graphical title element 332 for the user to input a title for the new media presentation. The client device 300 may provide the title element 332 in the first area 306a. The user may input text to enter a title. For example, as shown in the second area 306b, the client device 300 may provide a graphical keyboard 322 for the user to input a title. The user may use the keyboard 322 in the second area 306b to input a title for the new media presentation.

In connection with the title element 332, the client device 300 may also provide a clear title/cancel element 334 and an accept title/continue element 336. The clear title/cancel element 334 may provide a user with the ability to clear current input displayed in the title element 332 and/or exit out of the media segment capturing interface. The accept title element 336 may allow the user to accept the title input into the title element 332. Upon the user accepting the title, the client device 300 may display the title overlaid on the media presentation, as described above.

After accepting a title, or upon selecting the option to add to an existing media presentation (e.g., a previously titled media presentation), the client device 300 may facilitate capturing a media segment. To illustrate, the client device 300 may include a camera 318a and/or a microphone 318b to assist a user in capturing a media segment. The client device 300 may display images captured by the camera 318a within the first area 306a as the client device 300 captures an image or video segment. Further, the client device 300 may display, the title of the media presentation to which the user is adding a media segment, to assist the user in capturing appropriate subject matter in the captured media segment.

As shown in FIG. 4B, the client device 300 may a present a begin capture screen. The capture screen may display a countdown 338 before starting to capture a media segment. For instance, the client device 300 may count from three (3) or from another number. The countdown time may be configurable by the user. By providing a countdown, the user may prepare themselves before the client device 300 starts capturing a media segment. In some example embodiments, the client device 300 may not provide a countdown, but may immediately start capturing a media segment upon the client device 300 changing to the capture screen (or upon the user selecting a capture option on the capture screen).

Further, as shown in FIG. 4B, the client device 300 may display a cancel element 340. The cancel element 340 may cancel the capture of the media segment. More specifically, upon the user selecting the cancel element 340, the client device 300 may stop the countdown and cancel the capturing process of the media segment.

FIG. 4C illustrates the client device during the capture of a media segment. As shown, the client device 300 may display, in the first area 306a, the media segment as it is being captured. Further, the first area 306a may show one or more graphical selectable elements such as a finish capture element 342 and a cancel capture element 344. The finish capture element 342 may, when selected, stop the capturing of a segment. The cancel capture element 344 may cancel and/or restart the capturing process. Accordingly, during the segment capture, the user may interact, via the touchscreen 304, with the client device 300 to select the cancel element 344 of FIG. 4C to cancel and to restart capturing the media segment. Similarly, the user can select the finish capture element 342 shown in FIG. 4B when the user is finished capturing the media segment.

The second area 306a of FIG. 4C may be a blank, white, darken, or blacked-out image to assist the user in concentrating on capturing the media segment displayed in the first area 306a. Additionally or alternatively, the second area 306b may display options that assist the user in capturing a media segment. For example, the second area 306b may include options to select the capture of an image, video, or audio segment (e.g., rather than displaying the images in the first area 306a). Further, the second area 306b may provide additional options where the user can specify the duration the image segment and/or change the way the client device 300 captures a media segment (e.g., add a color filter pre-capture).

Upon a user selecting the finish capture element 342, the client device 300 may provide the user with a media segment review screen, as shown in FIG. 4D. In particular, in FIG. 4D, the client device 300 may display, in the first area 306a, selectable elements such as a replay element 346 and an accept capture element 348 (i.e., "Done" button). The replay element 346 allows a user to replay and review a media segment. In some example embodiments, the client device 300 may automatically replay the capture for the user once the user finishes the capture of the media segment. Alternatively, the user may select the replay element 346 of FIG. 4D to replay the capture.

The accept capture element 348 allows the user to confirm the user's approval of the media segment capture. If the user is satisfied with the captured media segment, the user can select the accept capture element 348 of FIG. 4D to add the captured media segment to the media presentation. Otherwise, the user can re-capture the media segment and/or exit the capturing process without submitting the captured media segment to be added to the media presentation. In other words, the client device 300 in FIG. 4D may display a re-capture element that allows a user to recapture the media segment (e.g., the client device 300 would take the user back to the begin capture screen shown in FIG. 4B). Further, the client device 300 may display an exit button that takes the user back to the media presentation feed.

As shown in the second area 306b of FIG. 4D, the client device 300 may include options to allow the user to select additional systems on which to share the media segment, such as a social networking system, a media sharing system, a messaging application, or other types of sharing applications. The options may be presented as toggle elements, such as toggle elements 340a-c. As shown, the user has selected to share the media segment on System 1 by toggling the toggle element 340a. Further, as shown, the user has not selected to share the media segment with Systems 2 or System 3. While toggle elements are shown, one will appreciate that the client device 300 may present other Systems for the user to share the media segment using a variety of methods, such as displaying the names of the System 1 along with an indication of whether the system is selected or not. Additionally or alternatively, the second area 306b of FIG. 4D may display options for the user to edit the captured media segment, such as trim the captured media segment and/or add filters to the captured media segment, as described above.

FIGS. 5A-5F illustrate the process playing one or more media presentations within the GUI 302 of the client device 300. For example, and as described above, the client device 300 may initiate the playing of a media presentation when a media presentation satisfies, engages, coincides, or otherwise matches an activation trigger, such as an activation area 350 or an activation boundary 330a-b, shown in FIGS. 5A-5F. Similarly, the client device 300 may pause the playing of a media presentation when a media presentation does not coincide or otherwise match an activation trigger.

As shown in FIGS. 5A-5F, the client device 300 may include a first activation area boundary 330a and a second activation area boundary 330b. The activation area boundaries 330a and 330b may form an activation area 350. As shown in FIG. 5A, for example, the client device 300 can initiate the playing of a first media presentation 308a when the first media presentation 308a is fully within the activation area 350. As long as the first media presentation 308a is activated, the client device 300 will continue to play the media presentation (or until a user provides input to stop or pause the media presentation). To illustrate, FIG. 5B shows the client device 300 playing the first media presentation 308a at the third media segment of the (e.g., media segment "3/6") while the first media presentation 308a remains within the activation boundaries.

Additionally or alternatively, the activation boundaries 330a-b may demarcate boundaries in which a portion of a media presentation needs to pass over to active the media presentation. For example, when an activated media presentation passes over one of the activation boundaries 330a-b, the media presentation system 102 may pause the media presentation. Likewise, when a media presentation fully passes over an activation boundary 330a-b (e.g., the trailing edge of the media presentation passes over an activation boundary 330a-b and the media presentation is within the activation area 350), the media presentation system 102 may initiate or resume play of the media presentation as well as pause any other media presentations that may be playing.

As shown in FIG. 5C, the user may navigate to the second media presentation 308b (e.g., the media presentation titled "Dealing with kids . . . "). When the user navigates to the second media presentation 308b, the client device 300 may pause the first media presentation 308a when the first media presentation 308a exits the activation area 350 or no longer satisfies the requirements of being active (e.g., passes over or out of the activation boundaries). As describe above, the client device 300 may display the paused frame to represent the first media presentation 308a. For example, as shown in FIG. 5C, the client device 300 pauses the first media presentation 308a on the third media segment of the first media presentation 308a. As such, the client device 300 displays the last played frame from the third media segment to represent the first media presentation 308a.

As also shown in FIG. 5C, the client device 300 may begin playing the second media presentation 308b at the first media segment (e.g., media segment "1/2") upon the second media presentation 308b activating. In some embodiments, the client device 300 may wait a set duration of time before playing the second media presentation 308b after the second media presentation 308b activates. For example, the client device 300 may require that a media presentation be located within the activation area 350 for at least 500 or 1000 milliseconds before initiating the play of the media presentation. In this manner, the client device 300 does not activate a media presentation that merely passes through the activation boundaries as the user is navigating (e.g., scrolling rapidly) to another media presentation.

The client device 300 may continue to play the second media presentation 308b while the second media presentation 308b is active (e.g., remains in the activation area 350 between the activation boundaries 330a-b). As illustrated in 5D, the client device 300 may play the second media presentation 308b at the second media segment (e.g., media segment "2/2") while the second media presentation 308b is activated.

If the user subsequently navigates back to the first media presentation 308a, the client device 300 may deactivate second media presentation 308b and activate the first media presentation 308a because the second media presentation 308b exits the activation area 350 and the first media presentation 308a re-enters the activation area 350. Accordingly, the client device 300 may pause the second media presentation 308b and resume play of the first media presentation 308a. As shown in FIG. 5E, the client device 300 may resume playing the first media presentation 308a at the third media segment (e.g., media segment "3/6"). In other words, the client device 300 may resume playing the first media presentation 308a from the point the user left off at when the user previously navigated away from the first media presentation 308a.

FIG. 5F shows the client device 300 playing the first media presentation 308a at the sixth media segment (e.g., media segment "6/6") while the first media presentation 308a remains within the activation boundaries. In other words, after the user navigates back to the first media presentation 308a, the client device 300 may play the first media presentation 308a as if the user had not navigated away from the first media presentation 308a.

Figure 6:
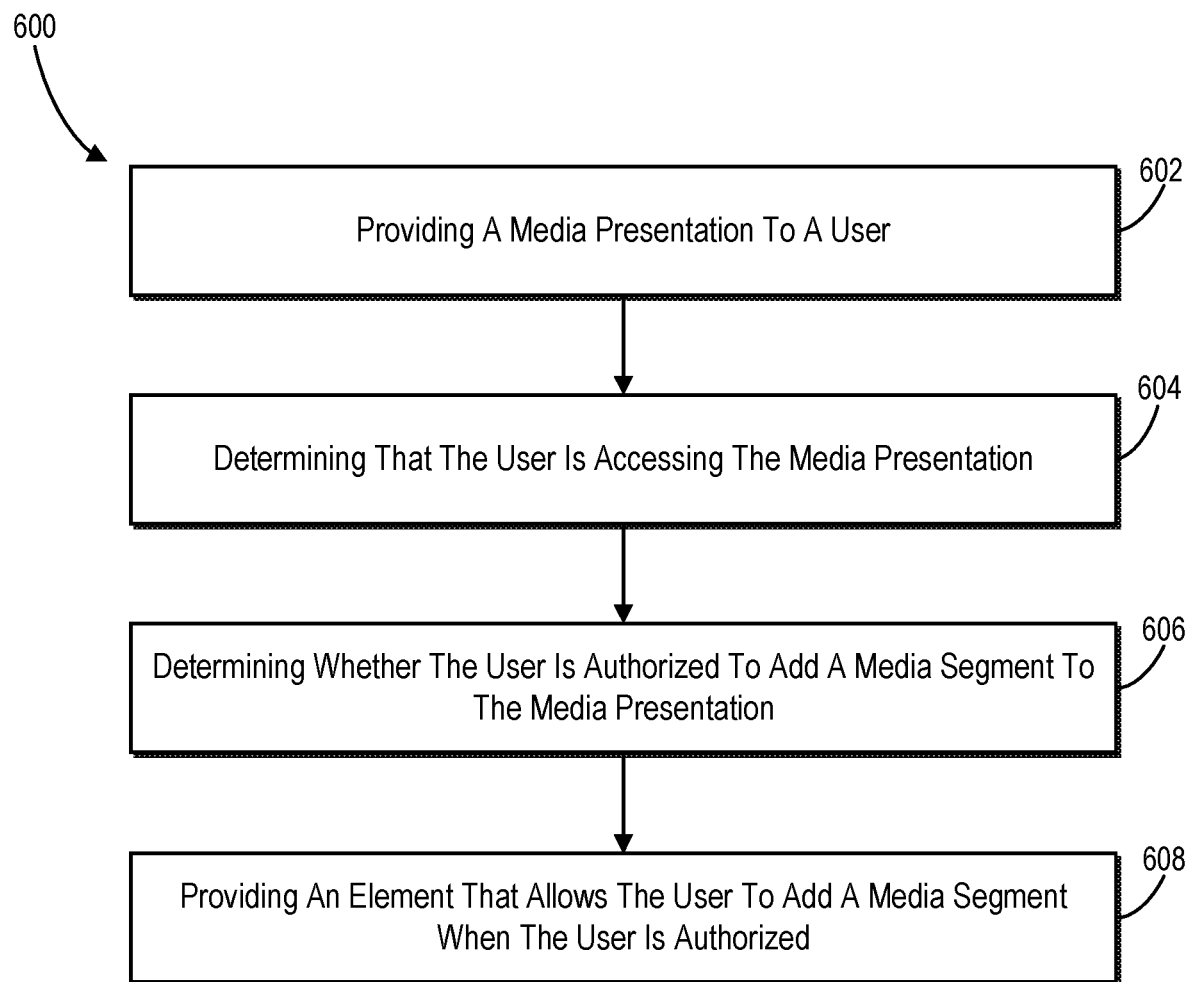
FIG. 6 illustrates a flowchart of a method of providing a media presentation to a user in accordance with one or more embodiments described herein.
Figure 7:
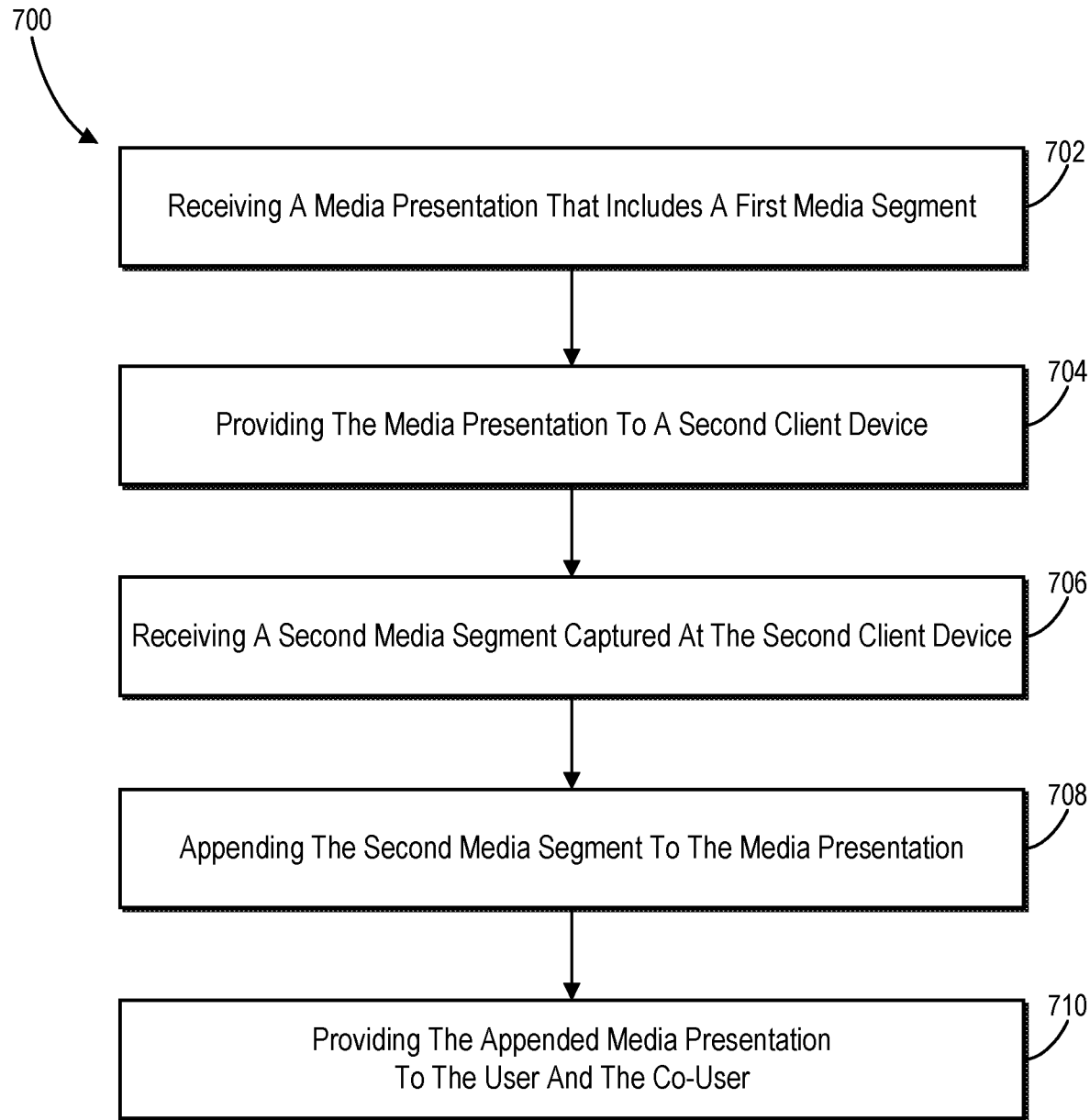
FIG. 7 illustrates a flowchart of a method of providing an appended media presentation to a user and co-users in accordance with one or more embodiments.

FIGS. 1-5, the corresponding text, and the examples, provide a number of different systems and devices for improving a user experience related to interacting with content across multiple client devices and/or mediums. In addition to the foregoing, embodiments of the present invention also can be described in terms of flowcharts comprising acts and steps in a method for accomplishing a particular result. For example, FIGS. 6-7 illustrate flowcharts of exemplary methods in accordance with one or more embodiments of the present invention. The methods described in relation to FIGS. 6-7 can be performed with less or more steps/acts or the steps/acts can be performed in differing orders. Additionally, the steps/acts described herein can be repeated or performed in parallel with one another or in parallel with different instances of the same or similar steps/acts.

FIG. 6 illustrates a flowchart of a method 600 of providing a media presentation to a user in accordance with one or more embodiments described herein. In some example embodiments, the method 600 may be performed by a client device, such as one of the client devices disclosed above in the previous figures.

The method 600 includes an act 602 of providing a media presentation to a user 110. In particular, the act 602 may involve providing, to a user 110 via a client device 104, a first media presentation 308a comprising a first plurality of media segments provided by a plurality of co-users. For example, the act 602 may involve providing the first media presentation 308a in a media presentation feed 318 displayed within a first graphical user interface area 306a of a graphical user interface 302 displayed on a client device 300.

The method 600 includes an act 604 of determining that a user is accessing the media presentation 308a. In particular, the act 604 may involve determining that the user 110 is accessing the first media presentation 308a. For instance, the act 604 may involve receiving navigational input from the user 110 to navigate to the first media presentation 308a within an activation area 350 and activating the first media presentation 308a. Further, the act 604 may involve presenting and/or playing the first media presentation 308a to the user 110.

In addition, the method 600 includes an act 606 of determining whether the user 110 is authorized to add a media segment to the media presentation. In particular, the act 606 may involve determining whether the user 110 is authorized to add a media segment to first media presentation 308a that the user is accessing. For example, the act 606 may involve determining whether a creator of the first media presentation 308a (e.g., a co-user) has authorized the user 110 to add a media segment to the first media presentation 308a. In one or more embodiments, wherein determining whether the user is authorized to add a media segment to the first media presentation that the user is accessing may include determining whether the affinity coefficient between the user the creator of the first media presentation 308a satisfies (e.g., meets or exceeds) a threshold level.

Further, the method 600 includes an act 608 of providing an element that allows the user 110 to add a media segment when on the user 110 is authorized. In particular, the act 608 may involve, based on determining that the user is authorized to add a media segment to the first media presentation 308a that the user is accessing, providing a selectable element 316 that allows the user to add a media segment to the first media presentation 308a. For example, the act 608 may involve displaying the selectable element 316 over the first media presentation 308a within the GUI 302 of the client device 300.

The method 600 may further involve an act of adding a media segment to the first media presentation 308a. In particular, the method 600 may include an act that, based on the user selecting the selectable element 316 that allows the user to add a media segment to the first media presentation 308*a*, involves capturing a media segment from the user and adding the captured media segment to the first media presentation 308*a* to create an appended first media presentation. In addition, the method 600 may also involve an act of receiving an indication that the one or more users of the plurality of users have viewed the appended first media presentation.

Additionally, the method 600 may involve an act of providing the first media presentation 308*a* to the user 110 without the selectable element 316 based on the user 110 not being authorized to add a media segment to the first media presentation 308*a* that the user 110 is accessing. The method 600 may also involve the act of providing, to the user 110, a selectable option to create a new media presentation, receiving, from the user 110, a selection of the selectable option to create a new media presentation, capturing one or more media segments for the new media presentation, and presenting the new media presentation to the user in the media presentation feed 318 that also includes the first media presentation 308*a*. Further, the act may involve receiving a selection of co-users of the plurality of co-users who are authorized to access the new media presentation.

In some example embodiments, the method 600 may involve an act of providing, to the user 110, a second media presentation 308*b* including a second plurality of media segments, the first media presentation 308*a* and the second media presentation 308*b* being part of a media presentation feed 318. In these embodiments, the acts may involve receiving a first navigational interaction from the user 110 to navigate to the second media presentation, determining that the user 110 is accessing the second media presentation 308*b* from the media presentation feed 318, and upon determining that the user 110 is accessing the second media presentation 308*b*, pausing the first media presentation 308*a* and playing the second media presentation 308*b*. In addition, the act may involve receiving a second navigational interaction from the user 110 to navigate to the first media presentation 308*a* subsequent to the user 110 accessing the second media presentation 308*b*, determining that the user 110 is accessing the first media presentation 308*a* from the media presentation feed 318, and upon determining that the user 110 is accessing the first media presentation 308*a* subsequent to the user accessing the second media presentation 308*b*, pausing the second media presentation 308*b* and resuming play of the first media presentation 308*a* from the paused position.

FIG. 7 illustrates a flowchart of a method 700 of providing an appended media presentation to a user and co-users in accordance with one or more embodiments described herein. In some example embodiments, the method 700 may be performed by a media presentation system, such as the media presentation system 102 disclosed above with regard to FIGS. 1 and 2.

The method 700 includes an act 702 of receiving a media presentation that includes a first media segment. In particular, the act 702 may involve receiving, from a first client device 104*a* associated with a user 110, a media presentation that includes a first media segment captured at the first client device 104*a*. The act 702 may also involve identifying additional media segments within the media presentation.

The method 700 includes an act 704 of providing the media presentation to a second client device 104*b*. In particular, the act 704 may involve providing the media presentation to a second client device 104*b* associated with a co-user 112 of the plurality of co-users. The act 704 may further involve providing the media presentation to additional client devices associated with other co-users of the plurality of co-users specified by the user 110.

The method 700 includes an act 706 of receiving a second media segment captured at the second client device 104*b*. In particular, the act 706 may involve receiving, from the second client device 104*b*, a second media segment captured at the second client device 104*b*. For example, the act 706 may involve receiving a media segment that the co-user 112 captured at the second client device 104*b* using a camera and/or microphone on the second client device 104*b*.

The method 700 includes an act 708 of appending the second media segment to the media presentation. In particular, the act 708 may involve appending the second media segment to the media presentation to create an appended media presentation. For instance, the act 708 may involve associating the second media segment with the first media segment. In some example embodiments, the act 708 may involve logically appending the second media segment to links associated with media segments in the media presentation to create the appended media presentation.

The method 700 includes an act 710 of providing the appended media presentation to the user 110 and the co-user 112. In particular, the act 710 may involve providing the appended media presentation to the user 110 and the co-user 112. For example, the act 710 may involve sending the second media segment to one or more client devices with instructions to associate the second media segment with the media presentation.

In one or more embodiments, the method 700 can include an act of receiving a request to provide the media presentation to co-users specified by the user 110. In particular, the act may involve receiving, from the first client device 104*a*, a request to provide the media presentation to a plurality of co-users specified by the user 110. Further, based on a determination that the user 110 has authorized the co-user 112 to add a media segment to the media presentation created by the user 110, providing the media presentation to the second device 104*b* associated with the co-user 112 may involve providing the media presentation to the second device 104*b* with an indication that the co-user 112 is authorized to add a media segment to the media presentation. For example, the indication may be a binary bit within the media presentation that is set (e.g., set to "1") when the co-users is authorized to add a media segment to the media presentation.

Further, in some example embodiments, the method 700 may include an act of receiving, from the first client device 104*a* associated with the user 110, an instruction to remove the second media segment that was added by the second user 104*b* from the media presentation. Further, the method 700 may include an act of receiving location information from the first client device 104*a* indicating the location of the first client device 104*a*, and dynamically creating a title for the media presentation based on the location information received from the first client device 104*a*. Additionally, in one or more embodiments, the method 700 may include an act of providing, within the media presentation, a first indication of a total number of media segments 312 within the media presentation, and providing, within the appended media presentation, a second indication of the total number of media segments within the appended media presentation.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 8:
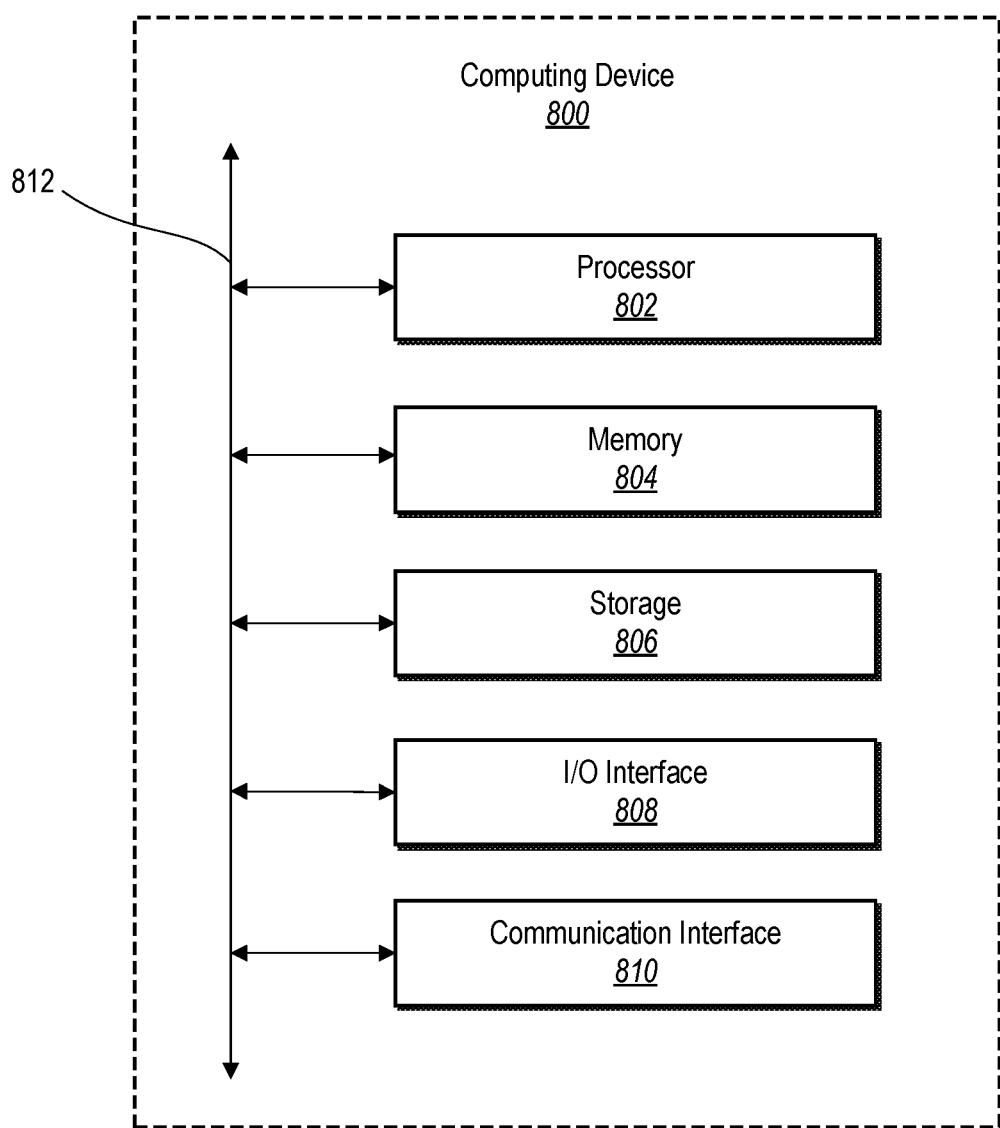
FIG. 8 illustrates a block diagram of a client device in accordance with one or more embodiments.

FIG. 8 illustrates a block diagram of exemplary computing device 800 that may be configured to perform one or more of the processes described above. One will appreciate that one or more computing devices such as the computing device 800 may implement the media presentation system 102 and/or computing devices 104a, 104b, 104, and 300. As shown by FIG. 8, the computing device 800 can comprise a processor 802, a memory 804, a storage device 806, an I/O interface 808, and a communication interface 810, which may be communicatively coupled by way of a communication infrastructure 812. While an exemplary computing device 800 is shown in FIG. 8, the components illustrated in FIG. 8 are not intended to be limiting. Additional or alternative components may be used in other embodiments. Furthermore, in certain embodiments, the computing device 800 can include fewer components than those shown in FIG. 8. Components of the computing device 800 shown in FIG. 8 will now be described in additional detail.

In one or more embodiments, the processor 802 includes hardware for executing instructions, such as those making up a computer program. As an example and not by way of limitation, to execute instructions, the processor 802 may retrieve (or fetch) the instructions from an internal register, an internal cache, the memory 804, or the storage device 806 and decode and execute them. In one or more embodiments, the processor 802 may include one or more internal caches for data, instructions, or addresses. As an example and not by way of limitation, the processor 802 may include one or more instruction caches, one or more data caches, and one or more translation lookaside buffers (TLBs). Instructions in the instruction caches may be copies of instructions in the memory 804 or the storage 806.

The memory 804 may be used for storing data, metadata, and programs for execution by the processor(s). The memory 804 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 804 may be internal or distributed memory.

The storage device 806 includes storage for storing data or instructions. As an example and not by way of limitation, storage device 806 can comprise a non-transitory storage medium described above. The storage device 806 may include a hard disk drive (HDD), a floppy disk drive, flash memory, an optical disc, a magneto-optical disc, magnetic tape, or a Universal Serial Bus (USB) drive or a combination of two or more of these. The storage device 806 may include removable or non-removable (or fixed) media, where appropriate. The storage device 806 may be internal or external to the computing device 800. In one or more embodiments, the storage device 806 is non-volatile, solid-state memory. In other embodiments, the storage device 806 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The I/O interface 808 allows a user to provide input to, receive output from, and otherwise transfer data to and receive data from computing device 800. The I/O interface 808 may include a mouse, a keypad or a keyboard, a touch screen, a camera, an optical scanner, network interface, modem, other known I/O devices or a combination of such I/O interfaces. The I/O interface 808 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 808 is configured to provide graphical data to a display for presentation to a user. The graphical data may be representative of one or more graphical user interfaces and/or any other graphical content as may serve a particular implementation.

The communication interface 810 can include hardware, software, or both. In any event, the communication interface 810 can provide one or more interfaces for communication (such as, for example, packet-based communication) between the computing device 800 and one or more other computing devices or networks. As an example and not by way of limitation, the communication interface 810 may include a network interface controller (NIC) or network adapter for communicating with an Ethernet or other wire-based network or a wireless NIC (WNIC) or wireless adapter for communicating with a wireless network, such as a WI-FI.

Additionally or alternatively, the communication interface 810 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the communication interface 810 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, the communication interface 810 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication infrastructure 812 may include hardware, software, or both that couples components of the computing device 800 to each other. As an example and not by way of limitation, the communication infrastructure 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

As mentioned above, the communication system 110 can comprise a social networking system. A social networking system may enable its users (such as persons or organizations) to interact with the system and with each other. The social networking system may, with input from a user, create and store in the social networking system a user profile associated with the user. The user profile may include demographic information, communication-channel information, and information on personal interests of the user. The social networking system may also, with input from a user, create and store a record of relationships of the user with other users of the social networking system, as well as provide services (e.g. wall posts, photo-sharing, on-line calendars and event organization, messaging, games, or advertisements) to facilitate social interaction between or among users. Also, the social networking system may allow users to post photographs and other multimedia content items to a user's profile page (typically known as "wall posts" or "timeline posts") or in a photo album, both of which may be accessible to other users of the social networking system depending upon the user's configured privacy settings.

Figure 9:
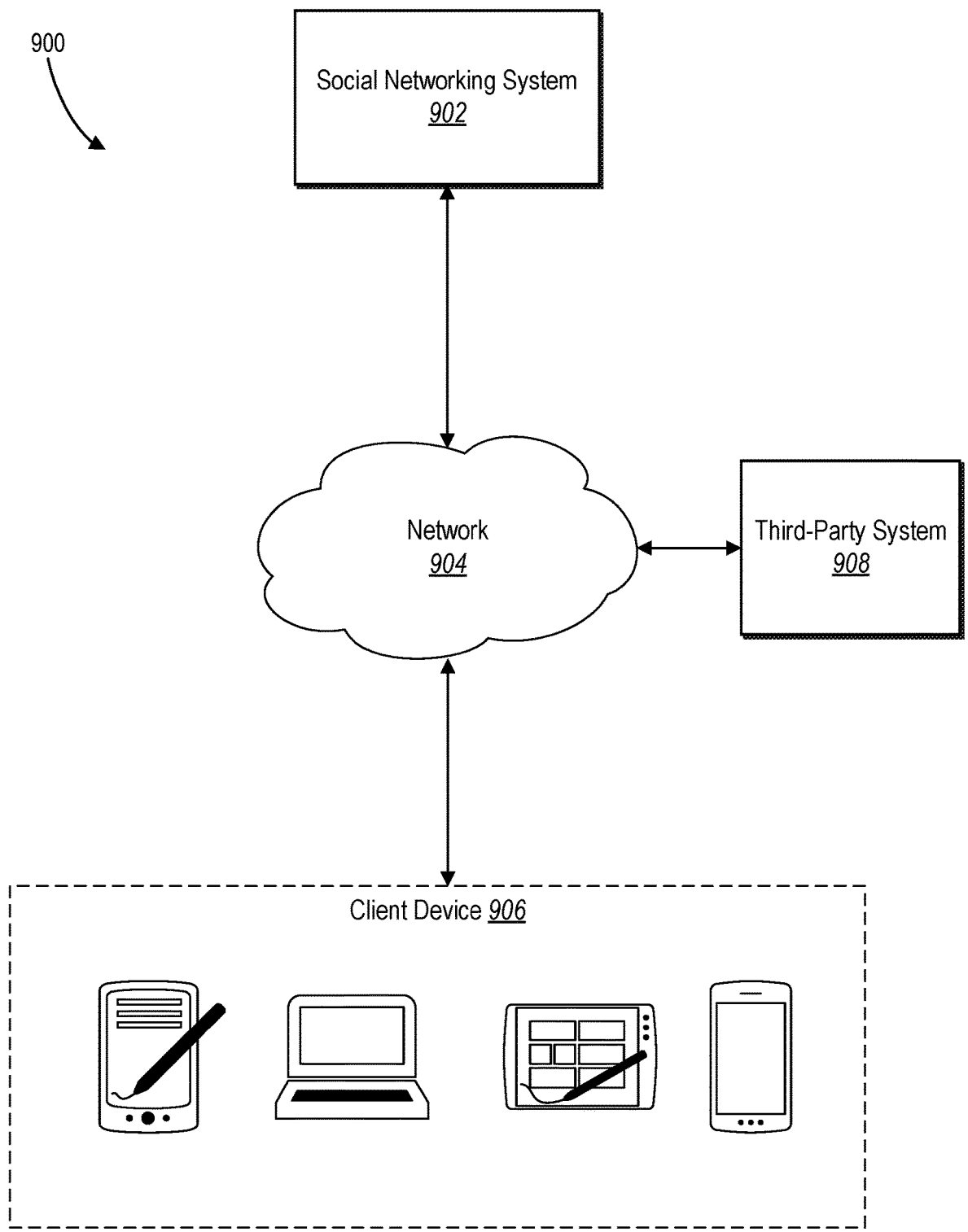
FIG. 9 illustrates a network environment of a social networking system in accordance with one or more embodiments described herein.

FIG. 9 illustrates an example network environment 900 of a social networking system. Network environment 900 includes a client system 906, a social networking system 902, and a third-party system 908 connected to each other by a network 904. Although FIG. 9 illustrates a particular arrangement of client system 906, social networking system 902, third-party system 908, and network 904, this disclosure contemplates any suitable arrangement of client system 906, social networking system 902, third-party system 908, and network 904. As an example and not by way of limitation, two or more of client system 906, social networking system 902, and third-party system 908 may be connected to each other directly, bypassing network 904. As another example, two or more of client system 906, social networking system 902, and third-party system 908 may be physically or logically co-located with each other in whole, or in part. Moreover, although FIG. 9 illustrates a particular number of client systems 906, social networking systems 902, third-party systems 908, and networks 904, this disclosure contemplates any suitable number of client systems 906, social networking systems 902, third-party systems 908, and networks 904. As an example and not by way of limitation, network environment 900 may include multiple client system 906, social networking systems 902, third-party systems 908, and networks 904.

This disclosure contemplates any suitable network 904. As an example and not by way of limitation, one or more portions of network 904 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 904 may include one or more networks 904.

Links may connect client system 906, social networking system 902, and third-party system 908 to communication network 904 or to each other. This disclosure contemplates any suitable links. In particular embodiments, one or more links include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 900. One or more first links may differ in one or more respects from one or more second links.

In particular embodiments, client system 906 may be an electronic device including hardware, software, or embedded logic components or a combination of two or more such components and capable of carrying out the appropriate functionalities implemented or supported by client system 906. As an example and not by way of limitation, a client system 906 may include any of the computing devices discussed above in relation to FIG. 8. A client system 906 may enable a network user at client system 906 to access network 904. A client system 906 may enable its user to communicate with other users at other client systems 906.

In particular embodiments, client system 906 may include a web browser, such as MICROSOFT INTERNET EXPLORER, GOOGLE CHROME, or MOZILLA FIREFOX, and may have one or more add-ons, plug-ins, or other extensions, such as TOOLBAR or YAHOO TOOLBAR. A user at client system 906 may enter a Uniform Resource Locator (URL) or other address directing the web browser to a particular server (such as server, or a server associated with a third-party system 908), and the web browser may generate a Hyper Text Transfer Protocol (HTTP) request and communicate the HTTP request to server. The server may accept the HTTP request and communicate to client system 906 one or more Hyper Text Markup Language (HTML) files responsive to the HTTP request. Client system 906 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social networking system 902 may be a network-addressable computing system that can host an online social network. Social networking system 902 may generate, store, receive, and send social-networking data, such as, for example, user-profile data, concept-profile data, social-graph information, or other suitable data related to the online social network. Social networking system 902 may be accessed by the other components of network environment 900 either directly or via network 904. In particular embodiments, social networking system 902 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by server. In particular embodiments, social networking system 902 may include one or more data stores. Data stores may be used to store various types of information. In particular embodiments, the information stored in data stores may be organized according to specific data structures. In particular embodiments, each data store may be a relational, columnar, correlation, or other suitable database. Although this disclosure describes or illustrates particular types of databases, this disclosure contemplates any suitable types of databases. Particular embodiments may provide interfaces that enable a client system 906, a social networking system 902, or a third-party system 908 to manage, retrieve, modify, add, or delete, the information stored in data store.

In particular embodiments, social networking system 902 may store one or more social graphs in one or more data stores. In particular embodiments, a social graph may include multiple nodes—which may include multiple user nodes (each corresponding to a particular user) or multiple concept nodes (each corresponding to a particular concept)—and multiple edges connecting the nodes. Social networking system 902 may provide users of the online social network the ability to communicate and interact with other users. In particular embodiments, users may join the online social network via social networking system 902 and then add connections (e.g., relationships) to a number of other users of social networking system 902 whom they want to be connected to. Herein, the term "friend" may refer to any other user of social networking system 902 with which a user has formed a connection, association, or relationship via social networking system 902.

In particular embodiments, social networking system 902 may provide users with the ability to take actions on various types of items or objects, supported by social networking system 902. As an example and not by way of limitation, the items and objects may include groups or social networks to which users of social networking system 902 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social networking system 902 or by an external system of third-party system 908, which is separate from social networking system 902 and coupled to social networking system 902 via a network 904.

In particular embodiments, social networking system 902 may be capable of linking a variety of entities. As an example and not by way of limitation, social networking system 902 may enable users to interact with each other as well as receive content from third-party systems 908 or other entities, or to allow users to interact with these entities through an application programming interfaces (API) or other communication channels.

In particular embodiments, a third-party system 908 may include one or more types of servers, one or more data stores, one or more interfaces, including but not limited to APIs, one or more web services, one or more content sources, one or more networks, or any other suitable components, e.g., that servers may communicate with. A third-party system 908 may be operated by a different entity from an entity operating social networking system 902. In particular embodiments, however, social networking system 902 and third-party systems 908 may operate in conjunction with each other to provide social-networking services to users of social networking system 902 or third-party systems 908. In this sense, social networking system 902 may provide a platform, or backbone, which other systems, such as third-party systems 908, may use to provide social-networking services and functionality to users across the Internet.

In particular embodiments, a third-party system 908 may include a third-party content object provider. A third-party content object provider may include one or more sources of content objects, which may be communicated to a client system 906. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social networking system 902 also includes user-generated content objects, which may enhance a user's interactions with social networking system 902. User-generated content may include anything a user can add, upload, send, or "post" to social networking system 902. As an example and not by way of limitation, a user communicates posts to social networking system 902 from a client system 906. Posts may include data such as status updates or other textual data, location information, photos, videos, links, music or other similar data or media. Content may also be added to social networking system 902 by a third-party through a "communication channel," such as a newsfeed or stream.

In particular embodiments, social networking system 902 may include a variety of servers, sub-systems, programs, modules, logs, and data stores. In particular embodiments, social networking system 902 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social networking system 902 may also include suitable components such as network interfaces, security mechanisms, load balancers, failover servers, management-and-network-operations consoles, other suitable components, or any suitable combination thereof. In particular embodiments, social networking system 902 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social networking system 902 to one or more client systems 906 or one or more third-party system 908 via network 904. The web server may include a mail server or other messaging functionality for receiving and routing messages between social networking system 902 and one or more client systems 906. An API-request server may allow a third-party system 908 to access information from social networking system 902 by calling one or more APIs. An action logger may be used to receive communications from a web server about a user's actions on or off social networking system 902. In conjunction with the action log, a third-party-content-object log may be maintained of user exposures to third-party-content objects. A notification controller may provide information regarding content objects to a client system 906. Information may be pushed to a client system 906 as notifications, or information may be pulled from client system 906 responsive to a request received from client system 906. Authorization servers may be used to enforce one or more privacy settings of the users of social networking system 902. A privacy setting of a user determines how particular information associated with a user can be shared. The authorization server may allow users to opt in to or opt out of having their actions logged by social networking system 902 or shared with other systems (e.g., third-party system 908), such as, for example, by setting appropriate privacy settings. Third-party-content-object stores may be used to store content objects received from third parties, such as a third-party system 908. Location stores may be used for storing location information received from client systems 906 associated with users. Advertisement-pricing modules may combine social information, the current time, location information, or other suitable information to provide relevant advertisements, in the form of notifications, to a user.

Figure 10:
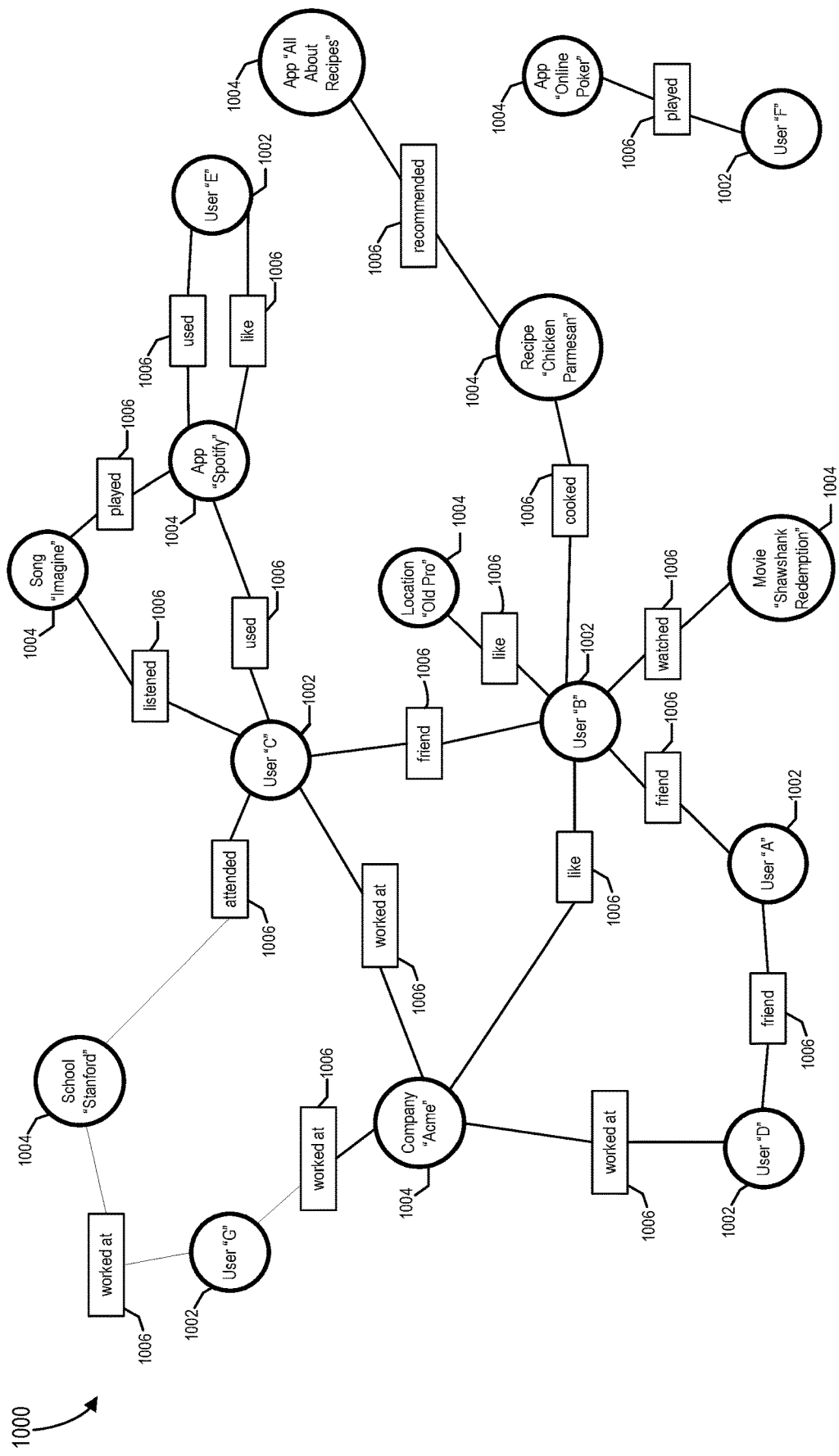
FIG. 10 illustrates an example social graph of a social networking system in accordance with one or more embodiments described herein.

FIG. 10 illustrates example social graph 1000. In particular embodiments, social networking system 902 may store one or more social graphs 1000 in one or more data stores. In particular embodiments, social graph 1000 may include multiple nodes—which may include multiple user nodes 1002 or multiple concept nodes 1004—and multiple edges 1006 connecting the nodes. Example social graph 1000 illustrated in FIG. 10 is shown, for didactic purposes, in a two-dimensional visual map representation. In particular embodiments, a social networking system 902, client system 906, or third-party system 908 may access social graph 1000 and related social-graph information for suitable applications. The nodes and edges of social graph 1000 may be stored as data objects, for example, in a data store (such as a social-graph database). Such a data store may include one or more searchable or query able indexes of nodes or edges of social graph 1000.

In particular embodiments, a user node 1002 may correspond to a user of social networking system 902. As an example and not by way of limitation, a user may be an individual (human user), an entity (e.g., an enterprise, business, or third-party application), or a group (e.g., of individuals or entities) that interacts or communicates with or over social networking system 902. In particular embodiments, when a user registers for an account with social networking system 902, social networking system 902 may create a user node 1002 corresponding to the user, and store the user node 1002 in one or more data stores. Users and user nodes 1002 described herein may, where appropriate, refer to registered users and user nodes 1002 associated with registered users. In addition or as an alternative, users and user nodes 1002 described herein may, where appropriate, refer to users that have not registered with social networking system 902. In particular embodiments, a user node 1002 may be associated with information provided by a user or information gathered by various systems, including social networking system 902. As an example and not by way of limitation, a user may provide his or her name, profile picture, contact information, birth date, sex, marital status, family status, employment, education background, preferences, interests, or other demographic information. Each user node of the social graph may have a corresponding web page (typically known as a profile page). In response to a request including a user name, the social networking system can access a user node corresponding to the user name, and construct a profile page including the name, a profile picture, and other information associated with the user. A profile page of a first user may display to a second user all or a portion of the first user's information based on one or more privacy settings by the first user and the relationship between the first user and the second user.

In particular embodiments, a concept node 1004 may correspond to a concept. As an example and not by way of limitation, a concept may correspond to a place (such as, for example, a movie theater, restaurant, landmark, or city); a website (such as, for example, a website associated with social-network system 902 or a third-party website associated with a web-application server); an entity (such as, for example, a person, business, group, sports team, or celebrity); a resource (such as, for example, an audio file, video file, digital photo, text file, structured document, or application) which may be located within social networking system 902 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 1004 may be associated with information of a concept provided by a user or information gathered by various systems, including social networking system 902. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 1004 may be associated with one or more data objects corresponding to information associated with concept node 1004. In particular embodiments, a concept node 1004 may correspond to one or more webpages.

In particular embodiments, a node in social graph 1000 may represent or be represented by a webpage (which may be referred to as a "profile page"). Profile pages may be hosted by or accessible to social networking system 902. Profile pages may also be hosted on third-party websites associated with a third-party server 908. As an example and not by way of limitation, a profile page corresponding to a particular external webpage may be the particular external webpage and the profile page may correspond to a particular concept node 1004. Profile pages may be viewable by all or a selected subset of other users. As an example and not by way of limitation, a user node 1002 may have a corresponding user-profile page in which the corresponding user may add content, make declarations, or otherwise express himself or herself. As another example and not by way of limitation, a concept node 1004 may have a corresponding concept-profile page in which one or more users may add content, make declarations, or express themselves, particularly in relation to the concept corresponding to concept node 1004.

In particular embodiments, a concept node 1004 may represent a third-party webpage or resource hosted by a third-party system 908. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system 906 to send to social networking system 902 a message indicating the user's action. In response to the message, social networking system 902 may create an edge (e.g., an "eat" edge) between a user node 1002 corresponding to the user and a concept node 1004 corresponding to the third-party webpage or resource and store edge 1006 in one or more data stores.

In particular embodiments, a pair of nodes in social graph 1000 may be connected to each other by one or more edges 1006. An edge 1006 connecting a pair of nodes may represent a relationship between the pair of nodes. In particular embodiments, an edge 1006 may include or represent one or more data objects or attributes corresponding to the relationship between a pair of nodes. As an example and not by way of limitation, a first user may indicate that a second user is a "friend" of the first user. In response to this indication, social networking system 902 may send a "friend request" to the second user. If the second user confirms the "friend request," social networking system 902 may create an edge 1006 connecting the first user's user node 1002 to the second user's user node 1002 in social graph 1000 and store edge 1006 as social-graph information in one or more of data stores. In the example of FIG. 10, social graph 1000 includes an edge 1006 indicating a friend relation between user nodes 1002 of user "A" and user "B" and an edge indicating a friend relation between user nodes 1002 of user "C" and user "B." Although this disclosure describes or illustrates particular edges 1006 with particular attributes connecting particular user nodes 1002, this disclosure contemplates any suitable edges 1006 with any suitable attributes connecting user nodes 1002. As an example and not by way of limitation, an edge 1006 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 1000 by one or more edges 1006.

In particular embodiments, an edge 1006 between a user node 1002 and a concept node 1004 may represent a particular action or activity performed by a user associated with user node 1002 toward a concept associated with a concept node 1004. As an example and not by way of limitation, as illustrated in FIG. 10, a user may "like," "attended," "played," "listened," "cooked," "worked at," or "watched" a concept, each of which may correspond to a edge type or subtype. A concept-profile page corresponding to a concept node 1004 may include, for example, a selectable "check in" icon (such as, for example, a clickable "check in" icon) or a selectable "add to favorites" icon. Similarly, after a user clicks these icons, social networking system 902 may create a "favorite" edge or a "check in" edge in response to a user's action corresponding to a respective action. As another example and not by way of limitation, a user (user "C") may listen to a particular song ("Ramble On") using a particular application (SPOTIFY, which is an online music application). In this case, social networking system 902 may create a "listened" edge 1006 and a "used" edge (as illustrated in FIG. 10) between user nodes 1002 corresponding to the user and concept nodes 1004 corresponding to the song and application to indicate that the user listened to the song and used the application. Moreover, social networking system 902 may create a "played" edge 1006 (as illustrated in FIG. 10) between concept nodes 1004 corresponding to the song and the application to indicate that the particular song was played by the particular application. In this case, "played" edge 1006 corresponds to an action performed by an external application (SPOTIFY) on an external audio file (the song "Imagine"). Although this disclosure describes particular edges 1006 with particular attributes connecting user nodes 1002 and concept nodes 1004, this disclosure contemplates any suitable edges 1006 with any suitable attributes connecting user nodes 1002 and concept nodes 1004. Moreover, although this disclosure describes edges between a user node 1002 and a concept node 1004 representing a single relationship, this disclosure contemplates edges between a user node 1002 and a concept node 1004 representing one or more relationships. As an example and not by way of limitation, an edge 1006 may represent both that a user likes and has used at a particular concept. Alternatively, another edge 1006 may represent each type of relationship (or multiples of a single relationship) between a user node 1002 and a concept node 1004 (as illustrated in FIG. 10 between user node 1002 for user "E" and concept node 1004 for "SPOTIFY").

In particular embodiments, social networking system 902 may create an edge 1006 between a user node 1002 and a concept node 1004 in social graph 1000. As an example and not by way of limitation, a user viewing a concept-profile page (such as, for example, by using a web browser or a special-purpose application hosted by the user's client system 906) may indicate that he or she likes the concept represented by the concept node 1004 by clicking or selecting a "Like" icon, which may cause the user's client system 906 to send to social networking system 902 a message indicating the user's liking of the concept associated with the concept-profile page. In response to the message, social networking system 902 may create an edge 1006 between user node 1002 associated with the user and concept node 1004, as illustrated by "like" edge 1006 between the user and concept node 1004. In particular embodiments, social networking system 902 may store an edge 1006 in one or more data stores. In particular embodiments, an edge 1006 may be automatically formed by social networking system 902 in response to a particular user action. As an example and not by way of limitation, if a first user uploads a picture, watches a movie, or listens to a song, an edge 1006 may be formed between user node 1002 corresponding to the first user and concept nodes 1004 corresponding to those concepts. Although this disclosure describes forming particular edges 1006 in particular manners, this disclosure contemplates forming any suitable edges 1006 in any suitable manner.

In particular embodiments, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more webpages, in one or more e-mails, or in connection with search results requested by a user. In addition or as an alternative, an advertisement may be one or more sponsored stories (e.g., a news-feed or ticker item on social networking system 902). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. As an example and not by way of limitation, advertisements may be included among the search results of a search-results page, where sponsored content is promoted over non-sponsored content.

In particular embodiments, an advertisement may be requested for display within social-networking-system webpages, third-party webpages, or other pages. An advertisement may be displayed in a dedicated portion of a page, such as in a banner area at the top of the page, in a column at the side of the page, in a GUI of the page, in a pop-up window, in a drop-down menu, in an input field of the page, over the top of content of the page, or elsewhere with respect to the page. In addition or as an alternative, an advertisement may be displayed within an application. An advertisement may be displayed within dedicated pages, requiring the user to interact with or watch the advertisement before the user may access a page or utilize an application. The user may, for example view the advertisement through a web browser.

A user may interact with an advertisement in any suitable manner. The user may click or otherwise select the advertisement. By selecting the advertisement, the user may be directed to (or a browser or other application being used by the user) a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, social networking system 902 may execute or modify a particular action of the user.

An advertisement may also include social-networking-system functionality that a user may interact with. As an example and not by way of limitation, an advertisement may enable a user to "like" or otherwise endorse the advertisement by selecting an icon or link associated with endorsement. As another example and not by way of limitation, an advertisement may enable a user to search (e.g., by executing a query) for content related to the advertiser. Similarly, a user may share the advertisement with another user (e.g., through social networking system 902) or RSVP (e.g., through social networking system 902) to an event associated with the advertisement. In addition or as an alternative, an advertisement may include social-networking-system context directed to the user. As an example and not by way of limitation, an advertisement may display information about a friend of the user within social networking system 902 who has taken an action associated with the subject matter of the advertisement.

In particular embodiments, social networking system 902 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 908 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social networking system 902 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part a the history of the user's actions. Coefficients may be used to predict any number of actions, which may be within or outside of the online social network. As an example and not by way of limitation, these actions may include various types of communications, such as sending messages, posting content, or commenting on content; various types of a observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social networking system 902 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social networking system 902 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social networking system 902 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social networking system 902 may calculate a coefficient based on a user's actions. Social networking system 902 may monitor such actions on the online social network, on a third-party system 908, on other suitable systems, or any combination thereof. Any suitable type of user actions may be tracked or monitored. Typical user actions include viewing profile pages, creating or posting content, interacting with content, joining groups, listing and confirming attendance at events, checking-in at locations, liking particular pages, creating pages, and performing other tasks that facilitate social action. In particular embodiments, social networking system 902 may calculate a coefficient based on the user's actions with particular types of content. The content may be associated with the online social network, a third-party system 908, or another suitable system. The content may include users, profile pages, posts, news stories, headlines, instant messages, chat room conversations, emails, advertisements, pictures, video, music, other suitable objects, or any combination thereof. Social networking system 902 may analyze a user's actions to determine whether one or more of the actions indicate an affinity for subject matter, content, other users, and so forth. As an example and not by way of limitation, if a user may make frequently posts content related to "coffee" or variants thereof, social networking system 902 may determine the user has a high coefficient with respect to the concept "coffee." Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social networking system 902 may calculate a coefficient based on the type of relationship between particular objects. Referencing the social graph 1000, social networking system 902 may analyze the number and/or type of edges 1006 connecting particular user nodes 1002 and concept nodes 1004 when calculating a coefficient. As an example and not by way of limitation, user nodes 1002 that are connected by a spouse-type edge (representing that the two users are married) may be assigned a higher coefficient than a user nodes 1002 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, social networking system 902 may determine that the user has a higher coefficient with respect to the first photo than the second photo because having a tagged-in-type relationship with content may be assigned a higher weight and/or rating than having a like-type relationship with content. In particular embodiments, social networking system 902 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social networking system 902 may determine that the first user should also have a relatively high coefficient for the particular object. In particular embodiments, the coefficient may be based on the degree of separation between particular objects. Degree of separation between any two nodes is defined as the minimum number of hops required to traverse the social graph from one node to the other. A degree of separation between two nodes can be considered a measure of relatedness between the users or the concepts represented by the two nodes in the social graph. For example, two users having user nodes that are directly connected by an edge (i.e., are first-degree nodes) may be described as "connected users" or "friends." Similarly, two users having user nodes that are connected only through another user node (i.e., are second-degree nodes) may be described as "friends of friends." The lower coefficient may represent the decreasing likelihood that the first user will share an interest in content objects of the user that is indirectly connected to the first user in the social graph 1000. As an example and not by way of limitation, social-graph entities that are closer in the social graph 1000 (i.e., fewer degrees of separation) may have a higher coefficient than entities that are further apart in the social graph 1000.

In particular embodiments, social networking system 902 may calculate a coefficient based on location information. Objects that are geographically closer to each other may be considered to be more related, or of more interest, to each other than more distant objects. In particular embodiments, the coefficient of a user towards a particular object may be based on the proximity of the object's location to a current location associated with the user (or the location of a client system 906 of the user). A first user may be more interested in other users or concepts that are closer to the first user. As an example and not by way of limitation, if a user is one mile from an airport and two miles from a gas station, social networking system 902 may determine that the user has a higher coefficient for the airport than the gas station based on the proximity of the airport to the user.

In particular embodiments, social networking system 902 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social networking system 902 may provide information that is relevant to user's interests and current circumstances, increasing the likelihood that they will find such information of interest. In particular embodiments, social networking system 902 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social networking system 902 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social networking system 902 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 908 (e.g., via an API or other communication channel), or from another suitable system. In response to the request, social networking system 902 may calculate the coefficient (or access the coefficient information if it has previously been calculated and stored). In particular embodiments, social networking system 902 may measure an affinity with respect to a particular process. Different processes (both internal and external to the online social network) may request a coefficient for a particular object or set of objects. Social networking system 902 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 8/503,093, filed Aug. 8, 2006, U.S. patent application Ser. No. 9/977,027, filed Dec. 22, 2010, U.S. patent application Ser. No. 9/978,265, filed Dec. 23, 2010, and U.S. patent application Ser. No. 10/632,869, field Oct. 1, 2012, each of which is incorporated by reference in their entirety.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 1004 corresponding to a particular photo may have a privacy setting specifying that the photo may only be accessed by users tagged in the photo and their friends. In particular embodiments, privacy settings may allow users to opt in or opt out of having their actions logged by social networking system 902 or shared with other systems (e.g., third-party system 908). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 908, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers may be authorization/privacy servers for enforcing privacy settings. In response to a request from a user (or other entity) for a particular object stored in a data store, social networking system 902 may send a request to the data store for the object. The request may identify the user associated with the request and may only be sent to the user (or a client system 906 of the user) if the authorization server determines that the user is authorized to access the object based on the privacy settings associated with the object. If the requesting user is not authorized to access the object, the authorization server may prevent the requested object from being retrieved from the data store, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

The foregoing specification is described with reference to specific exemplary embodiments thereof. Various embodiments and aspects of the disclosure are described with reference to details discussed herein, and the accompanying drawings illustrate the various embodiments. The description above and drawings are illustrative and are not to be construed as limiting. Numerous specific details are described to provide a thorough understanding of various embodiments.

The additional or alternative embodiments may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A computer-implemented method comprising:
receiving, at a server device and from a first client device associated with a first user, a media segment; and
providing, by at least one processor of the server device, the media segment within a media presentation to a second client device for presentation within a display area comprising an activation area and a deactivation area, wherein providing the media presentation to the second client device causes the second client device to:
play the media presentation upon the media presentation entering the activation area; and
pause the media presentation upon the media presentation entering the deactivation area.

2. The method of claim 1, wherein causing the second client device to pause the media presentation comprises causing the second client device to display the media presentation with a representative media frame within the display area of the second client device.

3. The method of claim 2, wherein the representative media frame comprises a last-played frame of the media presentation.

4. The method of claim 2, wherein the representative media frame comprises a next un-played frame of the media presentation.

5. The method of claim 1, wherein providing the media presentation to the second client device further causes the second client device to, after pausing the media presentation upon the media presentation entering the deactivation area, resume playing the media presentation upon the media presentation re-entering the activation area.

6. The method of claim 5, wherein the media presentation resumes playing from a next un-played frame of the media presentation.

7. The method of claim 5, wherein the media presentation resumes playing from a first frame of the media presentation.

8. The method of claim 1, further comprising causing the second client device to display, within the display area in connection with the media presentation, a selectable element that allows an additional media segment to be appended to the media presentation.

9. The method of claim 8, wherein the selectable element is displayed over a portion of the media presentation.

10. The method of claim 1, wherein:
the activation area comprises a first activation area boundary and a second activation area boundary; and
the media presentation enters the activation area upon a predefined portion of the media presentation moving between the first activation area boundary and the second activation area boundary.

11. A non-transitory computer-readable medium storing instructions thereon that, when executed by at least one processor, cause a computer system to:
receive, at a server device and from a first client device associated with a first user, a media segment; and
provide, by at least one processor of the server device, the media segment within a media presentation to a second client device for presentation within a display area comprising an activation area and a deactivation area, wherein providing the media presentation to the second client device causes the second client device to:
play the media presentation upon the media presentation entering the activation area; and
pause the media presentation upon the media presentation entering the deactivation area.

12. The non-transitory computer-readable medium of claim 11, wherein the activation area corresponds to the media presentation within a collection of navigable media presentations provided to the second client device.

13. The non-transitory computer-readable medium of claim 11, wherein causing the second client device to pause the media presentation comprises causing the second client device to display the media presentation with a representative media frame within the display area of the second client device.

14. The non-transitory computer-readable medium of claim 13, wherein the representative media frame comprises a last-played frame of the media presentation.

15. The non-transitory computer-readable medium of claim 13, wherein the representative media frame comprises a next un-played frame of the media presentation.

16. A system comprising:
at least one processor; and
at least one non-transitory computer-readable storage medium storing instructions thereon that, when executed by the at least one processor, cause the system to:
receive, at a server device and from a first client device associated with a first user, a media segment; and
provide, by at least one processor of the server device, the media segment within a media presentation to a second client device for presentation within a display area comprising an activation area and a deactivation area, wherein providing the media presentation to the second client device causes the second client device to:
play the media presentation upon the media presentation entering the activation area; and
pause the media presentation upon the media presentation entering the deactivation area.

17. The system of claim 16, wherein providing the media presentation to the second client device further causes the second client device to, after pausing the media presentation upon the media presentation entering the deactivation area, resume playing the media presentation upon the media presentation re-entering the activation area.

18. The system of claim 17, wherein the media presentation resumes playing from a next un-played frame of the media presentation.

19. The system of claim 17, wherein the media presentation resumes playing from a first frame of the media presentation.

20. The system of claim 16, further comprising instructions that, when executed by the at least one processor, cause the system to cause the second client device to display, within the display area in connection with the media presentation, a selectable element that allows an additional media segment to be appended to the media presentation, wherein the selectable element is displayed over a portion of the media presentation.

\* \* \* \* \*